United States Patent
Lee et al.

(10) Patent No.: US 9,471,216 B2
(45) Date of Patent: Oct. 18, 2016

(54) CIRCLE TYPE DISPLAY DEVICE FOR A MOBILE TERMINAL HAVING A SCROLL BAR AT THE EDGE OF ITS DISPLAY AND METHOD OF CONTROLLING THE SAME

(71) Applicant: LG ELECTRONICS INC., Seoul (KR)

(72) Inventors: Seonmi Lee, Seoul (KR); Sijin Lim, Seoul (KR); Yeonkyung Kim, Seoul (KR); Eunjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 106 days.

(21) Appl. No.: 14/491,746

(22) Filed: Sep. 19, 2014

(65) Prior Publication Data

US 2015/0012877 A1    Jan. 8, 2015

Related U.S. Application Data

(63) Continuation of application No. 12/969,947, filed on Dec. 16, 2010, now Pat. No. 8,860,674.

(30) Foreign Application Priority Data

Dec. 30, 2009  (KR) .................... 10-2009-0134716

(51) Int. Cl.
| | | |
|---|---|---|
| G06F 3/041 | (2006.01) | |
| G06F 3/0485 | (2013.01) | |
| G04G 21/08 | (2010.01) | |
| G06F 1/16 | (2006.01) | |
| G06F 3/0488 | (2013.01) | |
| G06F 3/0484 | (2013.01) | |
| H04M 1/725 | (2006.01) | |

(52) U.S. Cl.
CPC .......... *G06F 3/04855* (2013.01); *G04G 21/08* (2013.01); *G06F 1/163* (2013.01); *G06F 1/169* (2013.01); *G06F 1/1626* (2013.01); *G06F 1/1643* (2013.01); *G06F 3/0488* (2013.01); *G06F 3/04845* (2013.01); *H04M 1/72583* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 5,973,663 A | 10/1999 | Bates et al. | |
| 6,556,222 B1 | 4/2003 | Narayanaswami | |
| 7,932,893 B1 * | 4/2011 | Berthaud | G04G 21/00 178/18.06 |
| 2003/0103032 A1 * | 6/2003 | Wong | G06F 1/1626 345/156 |

(Continued)

FOREIGN PATENT DOCUMENTS

| | | |
|---|---|---|
| CN | 2927530 | 7/2007 |
| CN | 101261563 | 9/2008 |

(Continued)

OTHER PUBLICATIONS

U.S. Office Action issued in co-pending U.S. Appl. No. 12/969,947 dated Feb. 14, 2013.

(Continued)

*Primary Examiner* — Ilana Spar
*Assistant Examiner* — Kirk Hermann
(74) *Attorney, Agent, or Firm* — Ked & Associates, LLP

(57) ABSTRACT

A mobile terminal having a circle type display and a method for controlling the same is disclosed herein. A scroll bar is provided at an edge of the circle type display in response to a user input. The user may control the mobile terminal and the circle type display through touch inputs on the scroll bar.

21 Claims, 24 Drawing Sheets

(56) References Cited

U.S. PATENT DOCUMENTS

| | | | |
|---|---|---|---|
| 2004/0021702 A1 | 2/2004 | Lucaci et al. | |
| 2007/0236475 A1 | 10/2007 | Wherry | |
| 2009/0059730 A1* | 3/2009 | Lyons | G04G 21/04 |
| | | | 368/69 |
| 2009/0085851 A1 | 4/2009 | Lim et al. | |

FOREIGN PATENT DOCUMENTS

| | | |
|---|---|---|
| CN | 101576801 | 11/2009 |
| WO | WO 2007/103631 | 9/2007 |

OTHER PUBLICATIONS

U.S. Office Action issued in co-pending U.S. Appl. No. 12/969,947 dated Jul. 1, 2013.

U.S. Notice of Allowance issued in co-pending U.S. Appl. No. 12/969,947 dated Jun. 11, 2014.

Mankoff et al., Cirrin: a word-level unistroke keyboard for a pen input, 1998, UIST '98 Proceedings of the 11th annual ACM symposium on user interface software and technology, ACM, New Ork, pp. 213-214, ISBM: 1-58113-034-1.

Korean Office Action dated Sep. 14, 2015 issued in Application No. 10-2009-0134716.

* cited by examiner

CIRCLE TYPE DISPLAY DEVICE FOR A MOBILE TERMINAL HAVING A SCROLL BAR AT THE EDGE OF ITS DISPLAY AND METHOD OF CONTROLLING THE SAME

CROSS-REFERENCE TO RELATED APPLICATION(S)

This application is a Continuation of co-pending application Ser. No. 12/969,947 filed on Dec. 16, 2010, which claims priority under 35 U.S.C. §119 to Korean Application No. 10-2009-0134716 filed in Korea on Dec. 30, 2009, whose entire disclosure is hereby incorporated by reference.

BACKGROUND

1. Field

A display device for a mobile terminal and a method for controlling the same are disclosed herein.

2. Background

Display devices for mobile terminals and methods for controlling the same are known. However, they suffer from various disadvantages.

BRIEF DESCRIPTION OF THE DRAWINGS

The embodiments will be described in detail with reference to the following drawings in which like reference numerals refer to like elements, wherein.

DETAILED DESCRIPTION

Terminals may be classified as mobile (or portable) terminals and stationary terminals. The mobile terminals may be further classified as handheld terminals, vehicle mount terminals, or other appropriate portable configurations based on the needs of the user.

A terminal may be configured to perform multiple functions. For example, the terminal may be implemented as a multimedia player provided with composite functions to capture still pictures or videos, playback music or video, play games, receive broadcast signals, or other similar functions.

In order to support the increased functionality of the terminal, improvements in structural and/or software components of the terminal may be considered. For example, a mobile terminal may be configured to have a variety of structures to provide an efficient interface to the various functions provided. Based on the provided functionalities and user needs, the mobile terminal may be implemented as a sliding type, a folding type, a swivel type, a bar type, or another appropriate configuration.

Simply for ease of explanation, the terminal as broadly described and embodied herein is described as being a mobile terminal. However, embodiments of the present disclosure may be applicable to various types of terminals. Examples of such terminals may include mobile terminals as well as stationary terminals, for example, mobile phones, user equipment, smart phones, DTV, desktop or laptop computers, digital broadcast terminals, personal digital assistants (PDA), portable multimedia players (PMP), navigation systems, and other similar devices.

Figure 1:
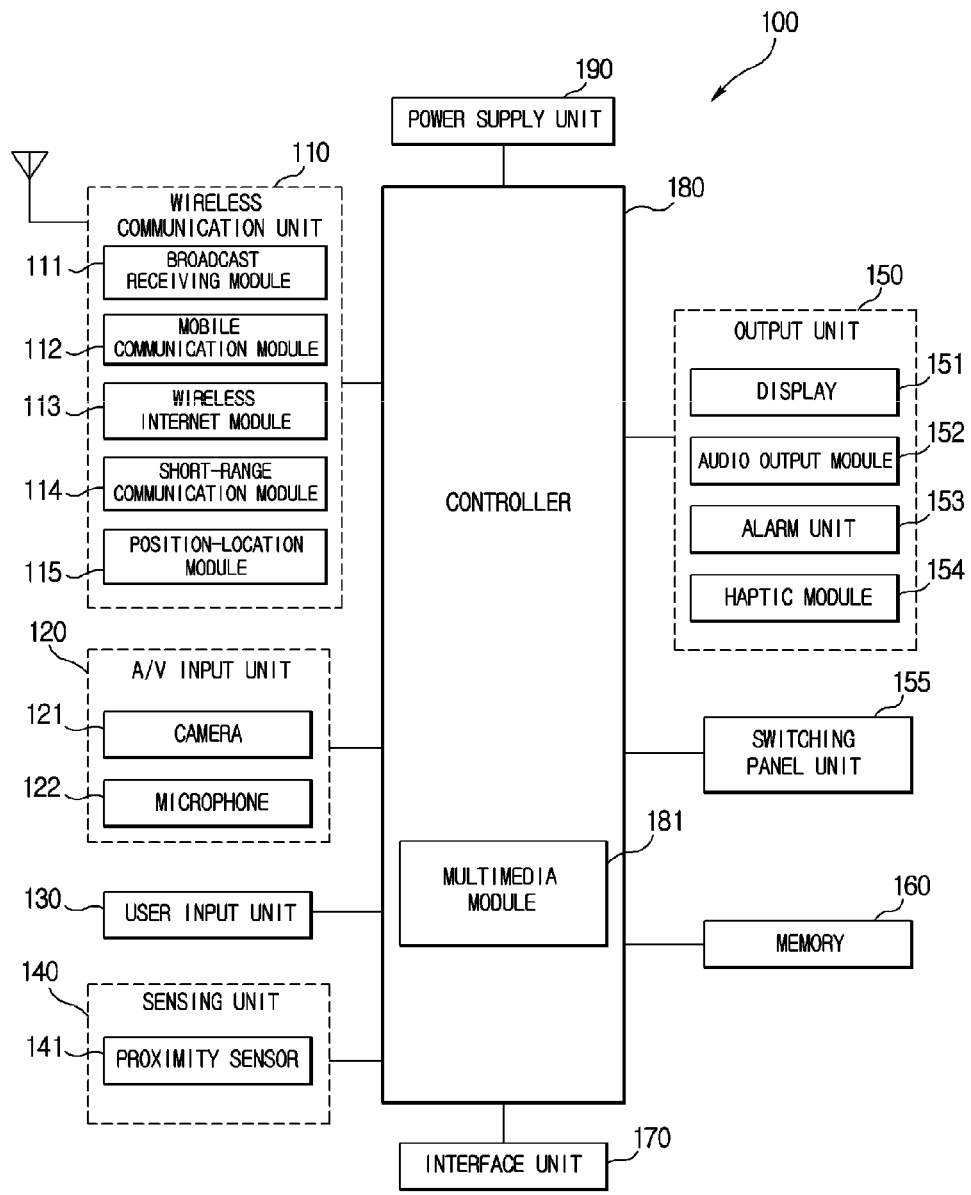
FIG. 1 is a block diagram of a mobile terminal according to an exemplary embodiment of the present disclosure.

FIG. 1 is a block diagram of a mobile terminal in accordance with an exemplary embodiment of the present disclosure. As shown in FIG. 1, mobile terminal 100 may include various components, although other components may also be used. The mobile terminal 100 may be provided with more or less components than as illustrated based on the configuration of the mobile terminal or needs of the user.

As shown in FIG. 1, the mobile terminal 100 may include a wireless communication unit 110, an audio/video (A/V) input unit 120, a user input unit 130, a sensing unit 140, an output unit 150, a switching panel unit 155, a memory 160, an interface unit 170, a controller 180, and a power supply 190.

The wireless communication unit 110 may be configured with several components and/or modules. The wireless communication unit 110 may include a broadcast receiving module 111, a mobile communication module 112, a wireless Internet module 113, a short-range communication module 114, and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wired communication unit. The wireless communication unit 110 and the wire communication unit may be commonly referred to as a communication unit or communication interface.

The broadcast receiving module 111 may receive a broadcast signal and/or broadcast associated information from an external broadcast managing server via a broadcast channel.

The broadcast channel may include a satellite channel and/or a terrestrial channel. The broadcast managing server may also be connected to another system or server that also transmits a broadcast signal and/or broadcast associated information to a mobile terminal. The broadcast signal may include not only a TV broadcast signal, a radio broadcast signal, or a data broadcast signal, but also a broadcast signal that may combine, for example, the TV or radio broadcast signals with a data broadcast signal. For example, the broadcast associated data may be embedded within the TV or radio broadcast signals for transmission to the mobile terminals.

The broadcast associated information may include information associated with a broadcast channel, a broadcast program, a broadcast service provider, or other appropriate information associated with the broadcast. The broadcast associated information may include an electronic program guide (EPG) of digital multimedia broadcasting (DMB) or an electronic service guide (ESG) of digital video broadcast-handheld (DVB-H). Moreover, the broadcast associated information may be advertisement information or other information that may be of interest to the user viewing the broadcast signal. The broadcast associated information may be provided to a mobile terminal to be used by an application on the mobile terminal or simply to be displayed to a user. Moreover, the broadcast associated information may be received by the mobile terminal either through the broadcast receiving module 111 or through the mobile communication module 112.

The broadcast receiving module 111 may receive broadcast signals transmitted from various types of broadcast systems. For example, the broadcast systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®), integrated services digital broadcast-terrestrial (ISDB-T), or other appropriate types of broadcasting systems. The broadcast receiving module 111 may also be configured to receive multicast signals. Moreover, data received by the broadcast receiving module 111 may be stored in the memory 160, for example.

The mobile communication module 112 may communicate wireless signals with one or more network entities, for example, a base station, an external terminal, or a server. The signals may represent audio, video, multimedia, control signaling, payload data, or other appropriate types of signals or data.

The wireless Internet module 113 may provide Internet access to the mobile terminal 100. This wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and/or HSDPA (High Speed Downlink Packet Access). The wireless Internet module 113 may be replaced with a wired Internet module in, for example, non-mobile terminals. The wireless Internet module 113 and the wired Internet module may be referred to as an Internet module.

The short-range communication module 114 is a module that may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be configured with global positioning system (GPS) components that cooperate with associated satellites, network components, and/or combinations thereof, to determine a position or location of the mobile terminal.

Referring again to FIG. 1, the audio/video (A/V) input unit 120 may provide audio or video signal input to the mobile terminal 100. The A/V input unit 120 may include a camera 121, a microphone 122, or other appropriate input devices. The camera 121 may capture and process still photo or video images. The processed images may be displayed on the display 151. The images processed by the camera 121 may be stored in the memory 160 or may be transmitted to another device, for example, through the wireless communication unit 110. Moreover, the mobile terminal 100 may be configured to have a plurality of cameras 121 provided thereon.

The microphone 122 may receive an external audio signal (e.g., analog sound waves) for input to the mobile terminal 100. For example, when the mobile terminal 100 is in a particular mode such as a phone call mode, a recording mode, and/or a voice recognition mode, the microphone 122 may capture sounds for input to the mobile terminal. The received audio signal may then be processed and converted into digital data.

The mobile terminal 100 may include, for example, as a part of the A/V input unit 120, a noise removing algorithm (noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Moreover, a plurality of microphones and/or cameras may be provided in the mobile terminal 100.

The user input unit 130 may generate input data responsive to a user manipulation of an associated input device or devices. Examples of such devices may include a keypad, a dome switch, a touchpad (e.g., static pressure/capacitance), a jog wheel, a jog switch, or other appropriate input devices. The user input unit 130 may also include a microphone to transmit voice inputs to the controller 180. The controller 180 may then apply a voice recognition algorithm to convert the received sound signals to corresponding digital data input. For example, when viewing a video on the mobile device, a voice commands may be used to control playback of the video including, for example, play, pause, stop, fast forward, reverse, repeat, or the like. Moreover, a plurality of the various input devices may be provided on the mobile terminal 100 to allow input of one command through the different types of input devices.

The sensing unit or sensor 140 may measure information related various aspects of the mobile terminal 100. For example, the sensing unit 140 may detect whether the mobile terminal 100 is in an open or closed state, a relative positioning of various components of the mobile terminal, for example, a position of a display relative to a keypad, a change in position of the mobile terminal 100 or a component of the mobile terminal 100, a presence or absence of a user input, whether the user is touching or holding the mobile terminal 100, an orientation or acceleration/deceleration of the mobile terminal 100, or other appropriate information which may be sensed.

For example, if the mobile terminal 100 is configured as a slide-type mobile terminal, the sensing unit 140 may sense whether a sliding portion of the mobile terminal 100 is open or closed. The sensing unit 140 may also sense whether power is being provided by the power supply 190, whether an external device is coupled or otherwise connected to the mobile terminal 100 through the interface unit 170, or the like. The sensing unit 140 may also include a proximity sensor 141 and an inclination detection or orientation sensor 142. For example, a gyro sensor and an acceleration sensor may be used in the inclination detection sensor 142 to detect a relative orientation or position of the mobile terminal.

The output unit 150 may generate an output associated with various senses of the user. For example, the output unit 150 may produce output that may stimulate a visual sense, an auditory sense, a tactile sense, and/or the like. As described in further detail hereinbelow, the output unit 150 may include a display unit 151, an audio output module 152, an alarm unit 153, or a haptic module 154.

The display unit 151 may display or output various information processed by the mobile terminal 100. For example, if the mobile terminal 100 is in a call mode, the display 151 may display a user interface (UI) or a graphic user interface (GUI) associated with a call. If the mobile terminal 100 is in a video communication mode or a photograph mode, the display unit 151 may be configured to display an image received during a communication session, an image captured by the camera, a UI, a GUI, or another appropriate image.

The display unit 151 may include at least one of a liquid crystal display (LCD), a thin film transistor liquid crystal display (TFT LCD), an organic light-emitting diode (OLED), a flexible display, or a 3-dimensional (3D) display. The display 151 may have a transparent or light-transmissive type configuration such that objects positioned behind the display 151 may be visible. This type of a display may be referred to as a transparent display. A transparent OLED (TOLED) is an example of a transparent display. A backside or rear surface of the display 151 may also have the light-transmissive type configuration. In this configuration, a user may be able to see an object located behind the terminal body through the display 151.

A plurality of display units 151 may also be provided on the mobile terminal 100. For example, a plurality of displays may be provided on a single surface of the terminal 100 by being integrated into one body or by being spaced apart from each other. Alternatively, each of a plurality of displays may be provided on different surfaces of the terminal 100.

If the display unit 151 and a sensor that detects a touch action (hereinafter referred to as a touch sensor) are configured in a mutual-layered structure (hereinafter referred to as a touch screen), the display unit 151 may be used as an input device as well as an output device. For example, the touch sensor 142 may include a touch film, a touch sheet, a touchpad, or another appropriate touch input device.

The touch sensor may convert pressure applied to a specific portion of the display 151, or a variation of electrostatic capacitance generated at a specific portion of the display 151, into an electric input signal. The touch sensor may be configured to detect a pressure of a touch as well as a position, size and duration of the touch.

If a touch input is provided at the touch sensor 142, signal(s) corresponding to the touch input may be transferred to a touch controller. The touch controller may process the signal(s), then transfer the corresponding data to the controller 180. The controller 180 may then determine the location of the touch on the display unit 151.

Referring again to FIG. 1, a proximity sensor 141 may be provided inside the mobile terminal and may be enclosed by the touch screen or positioned around or near the touch screen. The proximity sensor 141 may detect an object that may be approaching a predetermined detection surface or it may detect whether there is an object nearby using an electromagnetic force or infrared ray to remotely detect the object, thereby dispensing with a need for mechanical or physical contact. The proximity sensor may have a longer lifespan and increased durability than that of a contact sensor such that its utility may be higher.

The proximity sensor 141 may include a transmissive photo sensor, a direct reflective photo sensor, a mirror reflective photo sensor, a high frequency oscillating proximity sensor, a capacitive proximity sensor, a magnetic proximity sensor, an infrared proximity sensor, or another appropriate type of sensor that may detect a proximity of an object. When the touch screen is a capacitive type, a proximity of a pointer may be detected by changes in electric fields caused by the proximity of the pointer. The touch screen (touch sensor), therefore may also be classified as a proximity sensor.

For ease of explanation, a touch or pointer input which is detected to be proximately placed on a touch screen without touching the touch screen is referred to as a "proximity touch," and a pointer that physically makes contact with the touch screen is referred to as a "contact touch." For example, when a pointer is used to proximity-touch the touch screen, the location of the touch on the touch screen may be determined to be a position on the touch screen that horizontally corresponds to the position of the pointer when the pointer is detected by the proximity sensor 141.

The proximity sensor may detect the proximity touch and proximity touch pattern (e.g., proximity touch distance, proximity touch direction, proximity touch speed, proximity touch time, proximity touch position, proximity touch mobile state, etc.). Information corresponding to the detected proximity touch operation and proximity touch pattern may be displayed on the touch screen.

The audio output module 152 may output audio data that is received from the wireless communication unit 110 in, for example, a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm unit 153 may output a signal to announce an occurrence of an event in the mobile terminal 100. An event occurring in the mobile terminal 100 may include one of a call signal reception, a message reception, a key signal input, a touch input and/or the like. The alarm unit 153 may output a signal to notify the user of an occurrence of an event by way of a vibration or the like as well as a video signal or an audio signal. The alarm unit 152 may output a video alarm signal via the display 151 and the audio alarm signal via the audio output module 152. Moreover, the display 151 or the audio output module 152 may be a part of the alarm unit 153.

The haptic module 154 may provide various haptic effects that may be sensed by a user. Vibration is an example of a haptic effect generated by the haptic module 154. The intensity and pattern of the vibration generated from the haptic module 154 may be controlled or modified. For example, multiple vibrations that differ from each other may be synthesized and outputted either together or sequentially to create a unique haptic effect.

The haptic module 154 may generate various haptic effects including a vibration, an effect caused by a stimulus such as a pin array that moves vertically along a skin surface, an air jet via an outlet, an air suction via inlet, a skim on a skin surface, a contact by an electrode, an electrostatic power, a hot or cold sense reproduction using an endothermic or exothermic device, or other appropriate methods of producing haptic effects.

The haptic module 154 may provide the haptic effect via direct contact with the user. The haptic module 154 may enable a user to experience the haptic effect via sensations, on, for example, a finger, an arm and/or the like. A plurality of haptic modules 154 may also be provided in the mobile terminal 100.

The switching panel unit 155 is a constituent element for expressing a 3D image using the binocular disparity, the function of which will be described in detail with reference to FIG. 3.

The memory 160 may store a program for execution by the controller 180. The memory 160 may temporarily store input/output data, for example, a phonebook, message, still picture, moving picture, or other appropriate types of data. The memory 160 may also store data used to generate various patterns of vibration or sound associated with a touch input on the touch screen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk and/or the like. The memory 160 may also operate as a web storage device to provide a remote storage function over the Internet.

The interface unit 170 may provide access to external devices connected to the mobile terminal 100. The interface unit 170 may allow data transfer between the external devices and the mobile terminal 100. The interface unit 170 may also be configured to interface the mobile terminal 100 with an external power supply to deliver power to various components within the mobile terminal 100.

The interface unit 170 may enable data to be transferred to an external device from inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information to authenticate a user of the mobile terminal 100. The identity module may include a user identity module (UIM), a subscriber identity module (SIM), a universal subscriber identity module (USIM) and/or the like. A device provided with the above identity module may be manufactured in the form of a smart card. The identity device may be connected to the mobile terminal 100 via an interface port.

The interface unit 170 may also supply power to the mobile terminal 100 from a cradle that is connected to the mobile terminal 100. The interface unit 170 may also deliver various command signals, which may be inputted from the cradle by a user, to the mobile terminal 100. The supplied power or the various command signals received through the cradle may also serve as a signal for recognizing that the mobile terminal 100 is correctly seated in the cradle.

The controller 180 may control overall operations of the mobile terminal 100. For example, the controller 180 may perform control and processing relevant to a voice call, a data communication, a video conference and/or the like. The controller 180 may include a multimedia module 181 for multimedia playback. The multimedia module 181 may be implemented within the controller 180 or may be configured to be separate from the controller 180. The controller 180 may also perform pattern recognition processing to recognize various pattern input on the touch screen display. For example, the controller 180 may recognize a handwriting input on the touch screen to be a particular letter and/or a picture drawing input on the touch screen to be a particular image.

The power supply unit 190 may receive power from an external or internal power source. The power supply unit 190 may supply the power required for operations of the respective components of the mobile terminal 100 under the control of the controller 180.

Figure 2:
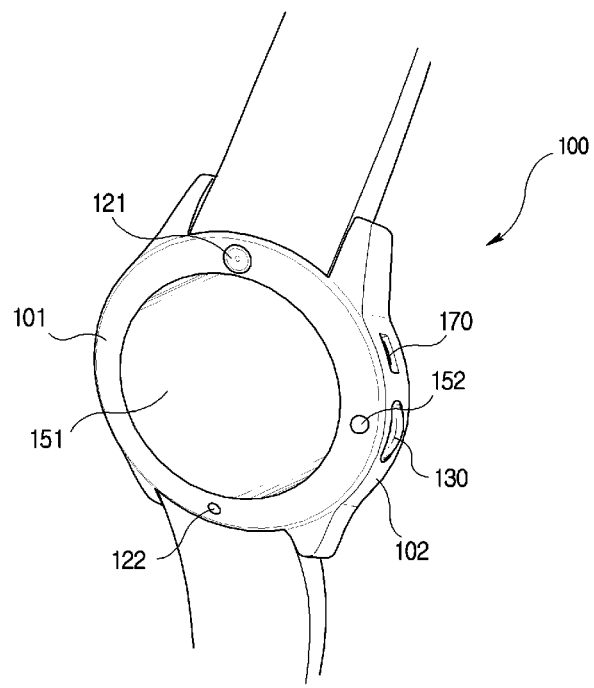
FIG. 2 is a front perspective view of a mobile terminal having a circle type display according to an exemplary embodiment of the present disclosure.

FIG. 2 is a front perspective view of a mobile terminal having a circle type display according to an exemplary embodiment of the present disclosure. Simply for ease of explanation, the mobile terminal as broadly described and embodied herein is described as being a wrist watch. However, the present application or patent is not limited thereto, and other configurations and arrangements may also be provided.

The body of the mobile terminal may include a case (casing, housing, cover, etc.) that forms an exterior of the wrist watch. The case may be divided into a front case 101 and a rear case 102. Various electronic parts may be provided inside the casing, e.g., between the front case 101 and the rear case 102. A middle case may also be provided between the front case 101 and the rear case 102. The casing may be formed of a synthetic resin or a metal such as stainless steel (STS), titanium (Ti), or other appropriate types of materials. Moreover, various processes may be used to form the casing, including, for example, injection molding.

The display unit 151, the audio output unit 152, the camera 121, user input units 130, the microphone 122, the interface unit 170, and the like may be provided on the terminal body, for example, on the front case 101. The display unit 151 may occupy most of front surface of the front case 101 and may be configured as a circle type display. The display 151 may also be configured as various other types, including, for example, oval, square, rectangular, or another appropriate type or shape. The camera 121 may be provided at an area adjacent to the display unit 151, while the user input unit 130 may be positioned on the lateral surfaces of the body.

The user input unit 130 may receive a command to control an operation of the mobile terminal 100. The user input unit 130 may include a plurality of manipulating units. The manipulating units may generally be referred to as a manipulating portion and may adopt any mechanism of a tactile manner that enables a user to perform a manipulation action through a tactile feeling. For example, the manipulating unit may include one or more of a button, joystick, wheel, toggle switch, or the like. Moreover, the casing may also include a hinge or another type of coupling structure provided across the body to couple a strap or other accessories, such as a watch strap, chain, or the like.

The display 151 may also be configured to be a user input unit 130 such as a touch screen display. When the mobile terminal is a relatively small device having a small display area, the touch screen may also be provided with additional input functionalities to facilitate user access. For example, a scroll bar may be provided on the touch screen display that allows easier access for the user to input commands.

Figure 3:
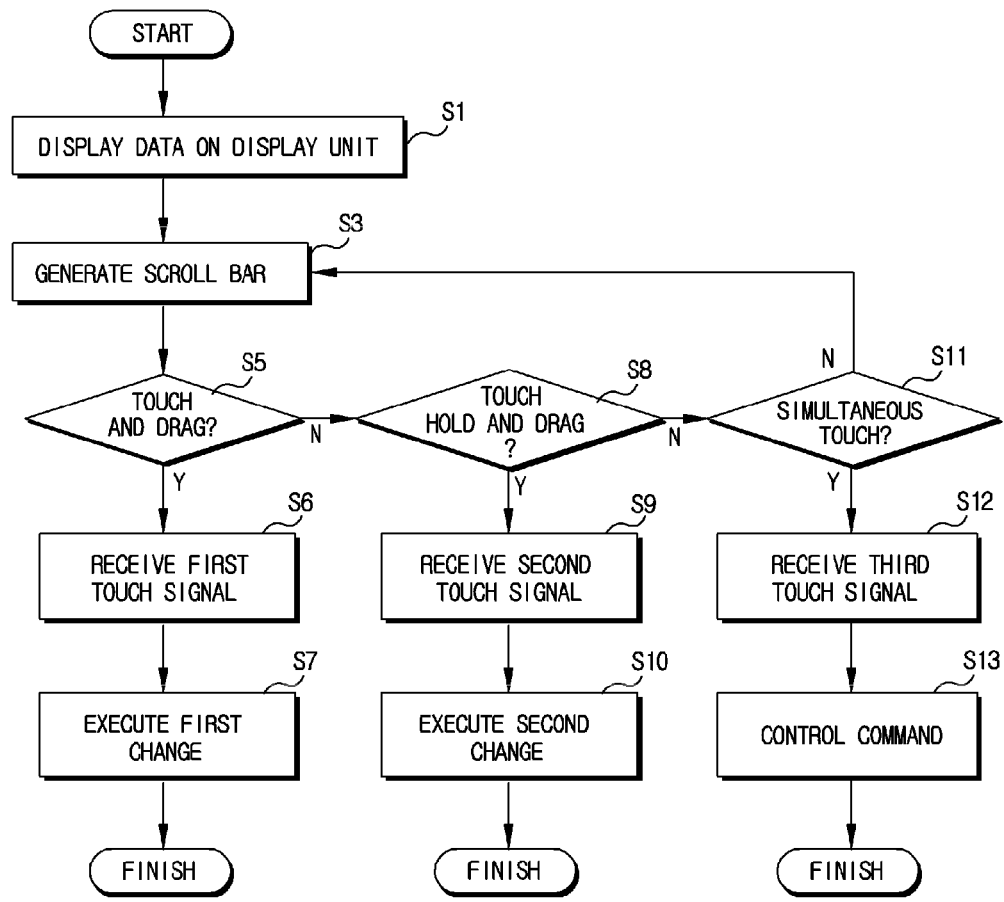
FIG. 3 is a flowchart of a method for controlling a mobile terminal having a circle type display according to an exemplary embodiment of the present disclosure.

FIG. 3 is a flowchart of a method for controlling a mobile terminal having a display according to an exemplary embodiment of the present disclosure. Referring to FIG. 3, data may be displayed on the display of the mobile terminal, in step S1. The display may be a circle type display. The data may include a menu list, an image, a text data, a webpage data, a moving picture image, or another appropriate type of data. In this state, a scroll bar may be generated and displayed at an edge of the circle type display, in step S3. The scroll bar may be generated or displayed in response to a user selection of the displayed data or other input. Moreover, the scroll bar may include a title scroll bar or a menu scroll bar.

The controller may then determine whether a touch-and-drag input is detected on the scroll bar, in step S5. If a touch-and-drag input is detected, in step S5, then the corresponding input signal may be transmitted to the controller, in step S6. The controller may then execute a first change to the data corresponding to the received input, in step S7. The first change may be to change the displayed image, for example, to scroll the displayed data in response to the touch-and-drag input.

If it is determined, in step S5, that the touch input is not a touch-and-drag input, the controller may then determine whether a touch-hold-and-drag input is detected, in step S8. In response to a touch-hold-and-drag input, a corresponding input signal may be transmitted to the controller, in step S9. The controller may then execute a second change to the data corresponding to the received input, in step S10. The second change may be to change the displayed image, for example, to zoom-in or zoom-out on the displayed image. Moreover, in response to the second touch input, a color of the scroll bar may be changed, whereby the user may visually verify whether the second touch signal was correctly inputted (e.g., activation of a second input mode).

If it is determined, in step S8, that the touch input is not a touch-hold-and-drag input, the controller may then determine whether a simultaneous touch input is detected, in step S11. In response to a simultaneous touch input, a corresponding input signal may be transmitted to the controller, in step S12. The controller may then execute a control command corresponding to the received input, in step S13. For example, if a control menu corresponding to the displayed data is available, then the available control menu may be displayed by the control command. The control menus may include, for example, a playback control menu corresponding to a displayed video, volume control menu, broadcast channel selection menu, or another appropriate type of menu based on the application or function of the mobile terminal. Accordingly, the user may conveniently input a control command that may correspond to the displayed data.

It should be appreciated that any appropriate command may be assigned to each type of input command. For example, each type of input (e.g., touch-and-drag, touch-hold-and-drag, or simultaneous touch) may be alternatively assigned to each of the other input commands. Moreover, a predetermined input command may be assigned to a particular type of input. For example, a click-hold-and-drag input may be configured to cause a predesignated menu screen, such as a user preferences menu or a control menu corresponding to a preassigned application, to be displayed on the display.

Simply for ease of explanation, the input interface of the display of the mobile terminal is described, in reference to FIG. 3 above, as a scroll bar. However, it should be appreciated that other methods of inputting data may be provided in conjunction with the scroll bar. For example, while the scroll bar may be used to zoom-in on an image as described above, the image may also be enlarged by other input commands such as a double click on the image, a pinch on the image, touch and hold or the like. Certain input commands may also be preassigned to be associated with a particular function through preference settings in the mobile terminal. For example, a double click input may be preassigned to be exclusive to the zoom-function. Moreover, various types of input devices may be provided in conjunction with the touch screen, such as voice input, hard buttons, or the like.

Figure 4A:
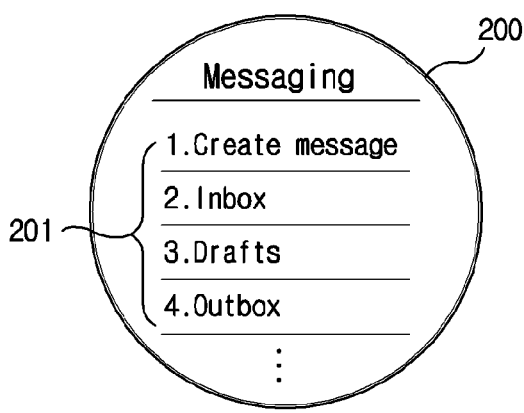
FIGS. 4A-4F illustrate an image displayed on a circle type display for a mobile terminal according to a first example of the present disclosure.
Figure 4B:
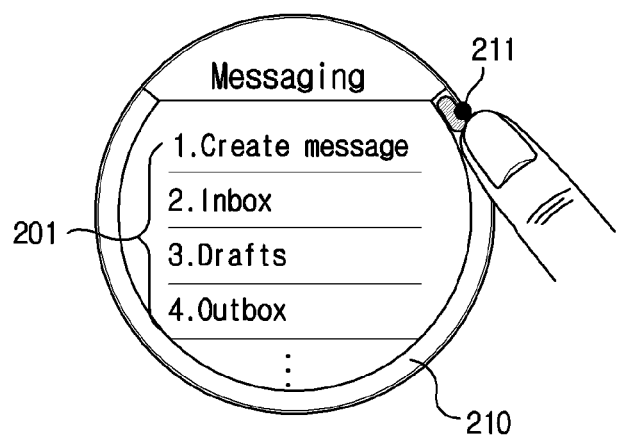

FIGS. 4A-4F illustrate an image displayed on a circle type display for a mobile terminal according to a first example of the present disclosure. FIG. 4A shows a message screen 200 displayed on the circle type display. The message screen 200 may include a message menu list 201. In this embodiment, when a blank or empty area of the display is touched for more than a predetermined period of time, a scroll bar 210 may generated at an edge of the circle type display, as shown in FIG. 4B. Although the above example describes touching a blank portion of the display to display the scroll bar, this embodiment is not limited thereto, and the scroll bar may be generated by any predesignated input such as an input to a hotkey, touching a predetermined area on the display, or a predetermined input sequence (e.g., double tap on the display).

Figure 4C:
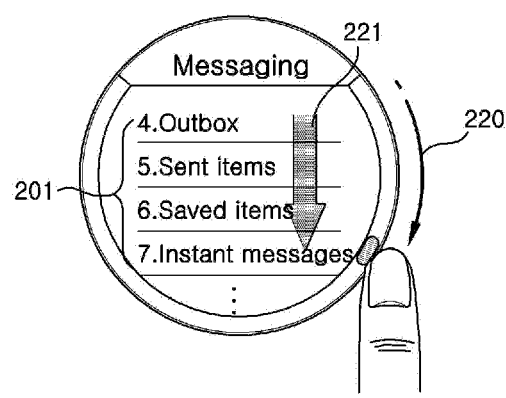
Figure 4D:
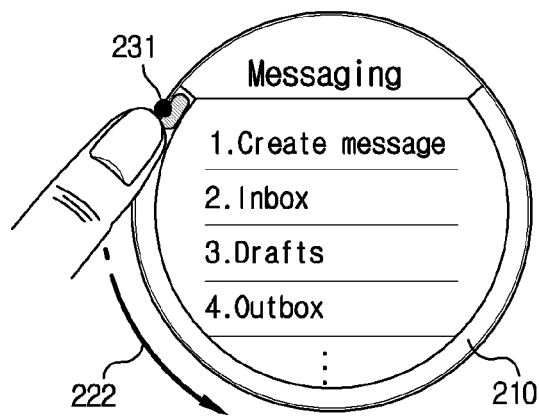

Referring to FIG. 4C, if a distal end 211 of the scroll bar is touched and dragged in a clockwise direction 220, the message menu list 201 may be scrolled down. At this time, a direction display icon 221 that indicates the scroll direction may be displayed on the circle type display in an overlay method. Meanwhile, as illustrated in FIG. 4D, if the other distal end 231 of the scroll bar 210 is touched and dragged in a counterclockwise direction 222, the message menu list may be scrolled in the opposite direction, e.g. scrolled up. At this time, a direction display icon that indicates the scroll direction may also be displayed on the circle type display in an overlay method.

Figure 4E:
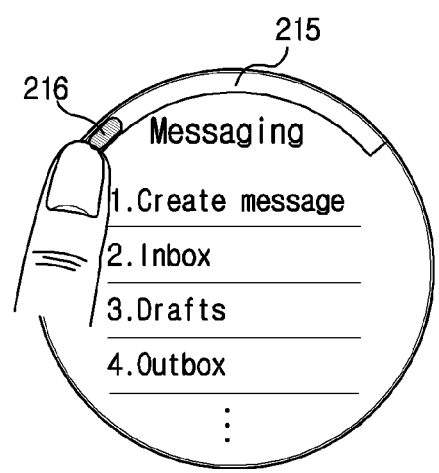
Figure 4F:
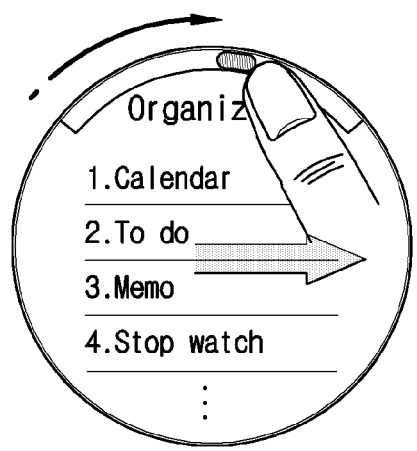

Referring to FIG. 4E, a title scroll bar 215 may be displayed at a top edge of the display. If a distal end 216 of the title scroll bar 215 is touched and dragged, the displayed menu may be changed. For example, as shown in FIG. 4F, the Messaging menu may be changed to a Organizer menu in response to the touch-and-drag input on the title scroll bar 215.

Figure 5A:
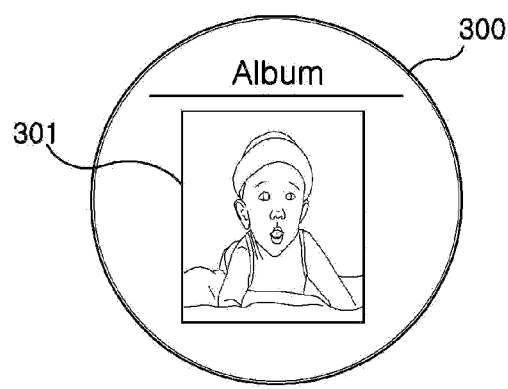
FIGS. 5A-5G illustrate an image displayed on a circle type display for a mobile terminal according to a second example of the present disclosure.
Figure 5B:
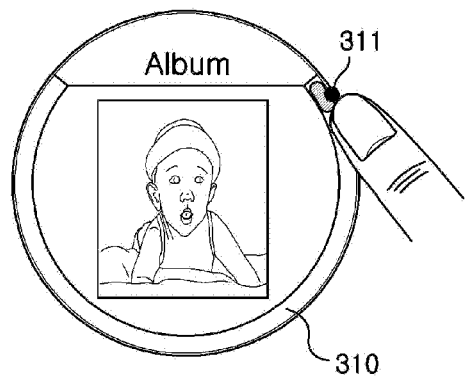

FIGS. 5A-5G illustrate an image displayed on a circle type display on a mobile terminal according to a second example of the present disclosure. Referring to FIG. 5A, an album screen 300 is displayed on the circle type display. The album screen 300 may include an image 301. In this embodiment, when a blank or empty area of the display is touched for more than a predetermined period of time, a scroll bar 310 may be generated at an edge of the circle type display, as shown in FIG. 5B. Although the above example describes touching a blank portion of the display to display the scroll bar, this embodiment is not limited thereto, and the scroll bar may be generated by any predesignated input such as an input to a hotkey, touching a predetermined area on the display, or a predetermined input sequence (e.g., double tap on the display).

Figure 5C:
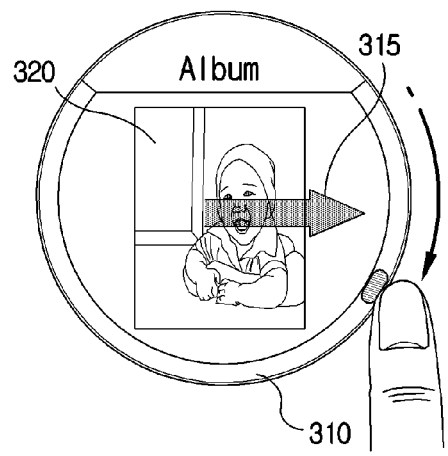

Referring to FIG. 5C, if a distal end 311 of the scroll bar 310 is touched and dragged in a clockwise direction, the displayed image 301 may be changed to display a next image 320 on the circle type display. At this time, a direction display icon 315 may be displayed that indicates a direction of the change in image.

Figure 5D:
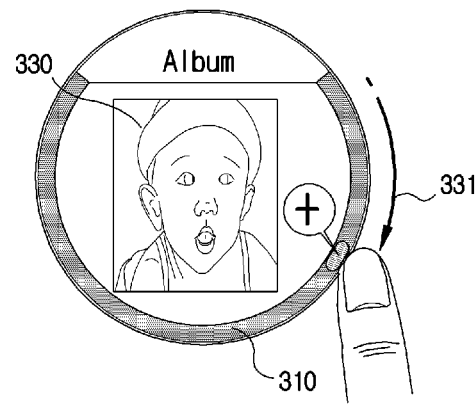
Figure 5E:
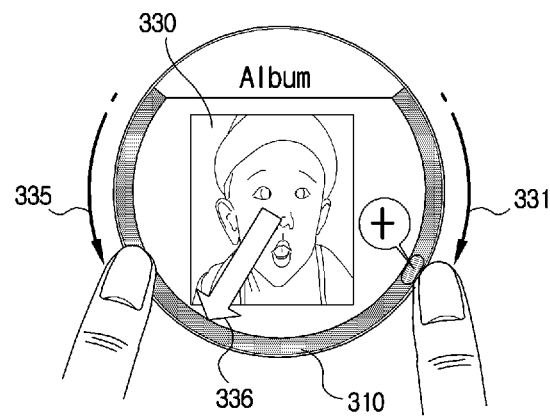

Referring to FIG. 5D, if the scroll bar 310 is touched, held and dragged in a clockwise direction 331 (e.g., a touch-hold-and-drag input at a distal end of the scroll bar 310), the scroll bar 310 may change in color, and the displayed image 330 may be enlarged by a zoom-in function. Moreover, while the scroll bar is selected to zoom the image, if the scroll bar 310 is selected again by a simultaneous touch (e.g., a simultaneous touch input at the other distal end), and dragged in a counterclockwise direction 335, the enlarged image 330 may be moved towards the lower left hand direction as indicated by the direction display icon 336, as shown in FIG. 5E. Likewise, if the scroll bar is selected and dragged in a clockwise direction by a simultaneous touch (e.g., a simultaneous touch input at another point on the scroll bar 310), the enlarged image may be moved in the upper right hand direction.

Figure 5F:
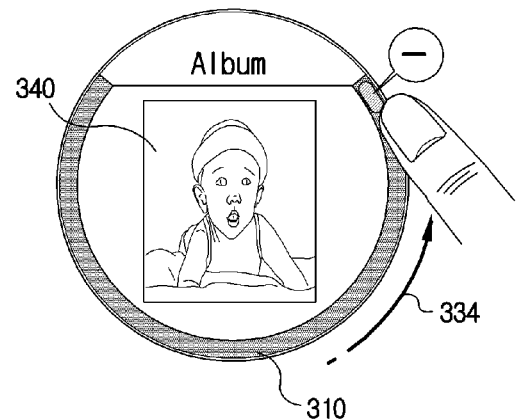
Figure 5G:
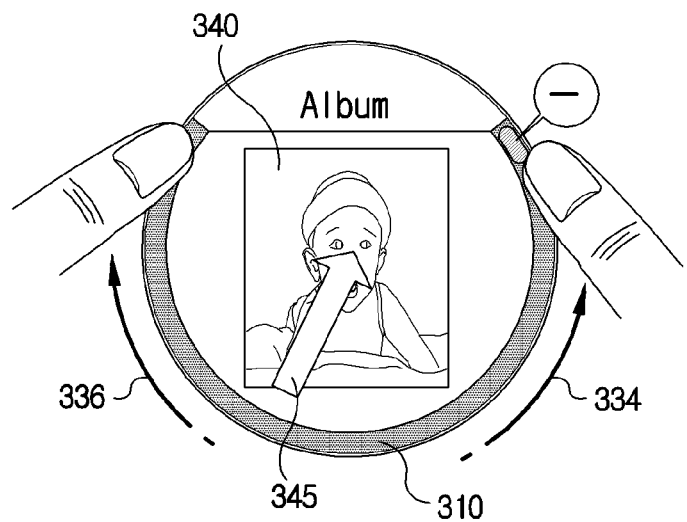

If the scroll bar 310 is touched, held and dragged in a counterclockwise direction 334, a zoom-out function may be implemented to zoom-out on the image, as shown in FIG. 5F, and a reduced image 340 may be displayed on the display. Moreover, while the scroll bar 310 is selected to zoom-out on the image 340, a simultaneous touch input in a clockwise direction 336 may move the reduced image 340 in an upper right hand direction as indicated by a direction display icon 345, as shown in FIG. 5G. Likewise, simultaneous touch input in a counterclockwise direction may move the reduced image 340 in a lower left hand direction. Hence, the touch-and-drag operation on the scroll bar may be used to scroll through images in a stored album, the touch-hold-and-drag operation may be used to adjust a size of an image, and the simultaneous touch input may be used to move the modified image on the display.

Figure 6A:
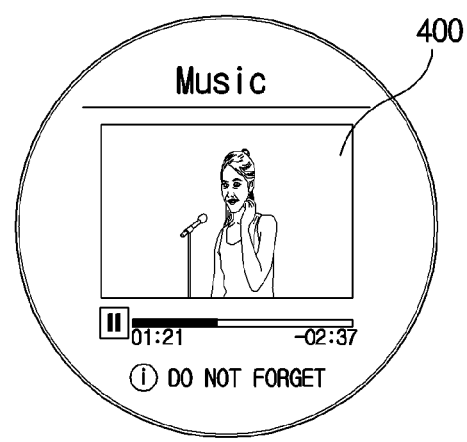
FIGS. 6A-6D illustrate an image displayed on a circle type display for a mobile terminal according to a third example of the present disclosure.
Figure 6B:
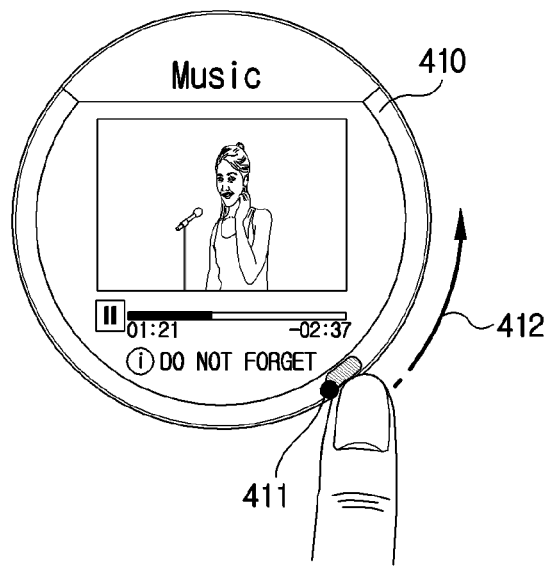

FIGS. 6A-6D illustrate an image displayed on a circle type display for a mobile terminal according to a third example of the present disclosure. FIG. 6A illustrates an example in which a video 400 (moving picture image) is displayed on the circle type display. In this embodiment, if a blank or empty area of the display is touched for more than a predetermined period of time while the moving picture image 400 is displayed, a scroll bar 410 may be generated at an edge of the circle type display, as shown in FIG. 6B. Although the above example describes touching a blank portion of the display to display the scroll bar, this embodiment is not limited thereto, and the scroll bar may be generated by any predesignated input such as an input to a hotkey, touching a predetermined area on the display, or a predetermined input sequence (e.g., double tap on the display).

Figure 6C:
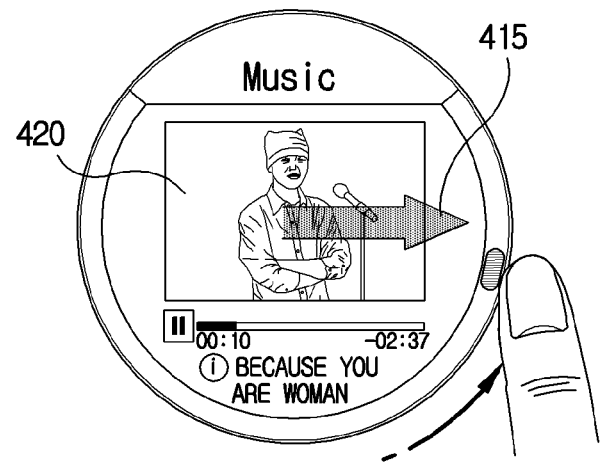

Referring to FIG. 6C, if a portion 411 of the scroll bar 410 is touched and dragged in a counterclockwise direction 412, the displayed video may be changed to display the next video 420 on the circle type display. At this time, a direction display icon 415 may be displayed that indicates a direction of the change in image.

Figure 6D:
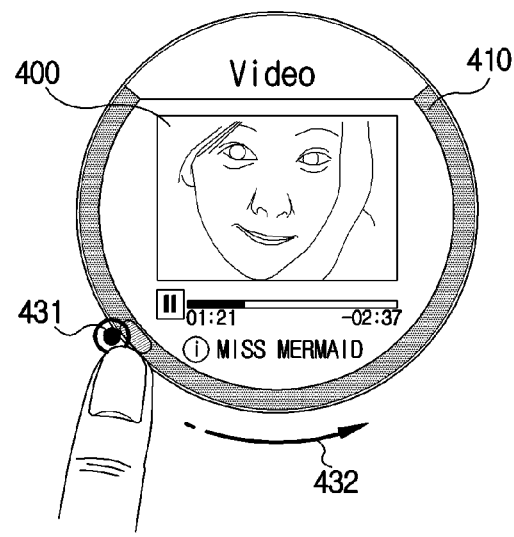

Referring to FIG. 6D, a touch-hold-and-drag input at a point 431 on the scroll bar 410 in a counterclockwise direction 432 may be configured to cause the color of the scroll bar 410 to be changed and the mobile terminal may be placed in a progressive control mode to navigate the displayed video 400. In this mode, a fast forward function may be implemented to allow navigation through the displayed video 400 when the scroll bar is dragged in the counterclockwise direction 432. Alternatively, if the scroll bar 410 is dragged in a clockwise direction by the touch-hold-and-drag input, a rewind function may be implemented on the moving picture image 400.

Figure 7A:
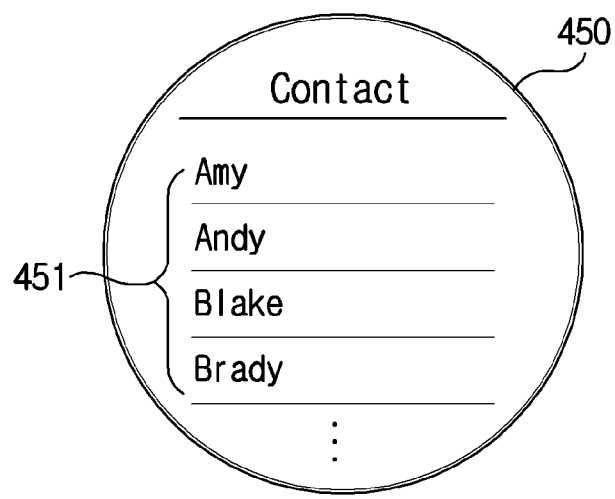
FIGS. 7A-7C illustrate an image displayed on a circle type display for a mobile terminal according to a fourth example of the present disclosure.
Figure 7B:
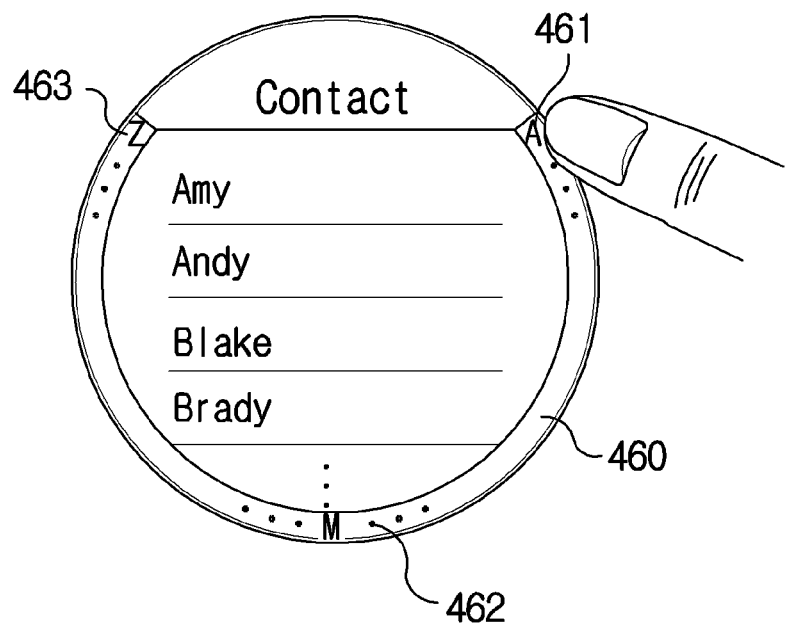
Figure 7C:
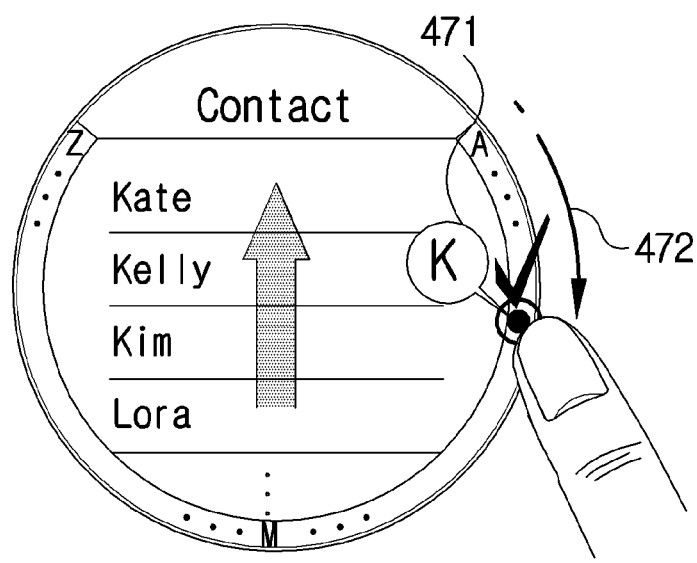

FIGS. 7A-7C illustrate an image displayed on a circle type display for a mobile terminal according to a fourth example of the present disclosure. FIG. 7A illustrates an example in which a telephone number list screen or contact list 450 may be displayed on the circle type display which may include a telephone number list 451. In this embodiment, if a blank or empty area of the display is touched for more than a predetermined period of time while the telephone number list 451 is displayed, a scroll bar 460 may be generated at an edge of the circle type display, as shown in FIG. 7B. Although the above example describes touching a blank portion of the display to display the scroll bar, this embodiment is not limited thereto, and the scroll bar may be generated by any predesignated input such as an input to a hotkey, touching a predetermined area on the display, or a predetermined input sequence (e.g., double tap on the display).

The scroll bar 460 may include alphabetical indexes 461, 462, 463 that correspond to the letters of the alphabet. The indexes 461, 462, 463 may correspond to the first letter of the entries in the telephone number list 451, and may be used to scroll through the displayed telephone number list 451. For example, if the scroll bar 460 is selected at a point on the scroll bar 460 at index 461, the list 451 may be scrolled to display the entries that correspond to the letter associated with index 461, e.g., the letter A. If a touch-and-drag input is used to move to another index in a clockwise direction 472 (for example, the letter K), the displayed telephone number list 451 may be scrolled to display the entries corresponding to the new index (for example, entries starting with the letter K), as illustrated in FIG. 7C. At this time, an icon 471 that displays the letter corresponding to the selected index may be further displayed.

Simply for ease of explanation, the indexes have been described in this embodiment as being an alphabetical index, but the present patent or application is not limited thereto. For example, the index may be configured to use numbers, dates, file types, or another appropriate index or description depending on the subject matter to be displayed and searched.

Figure 8A:
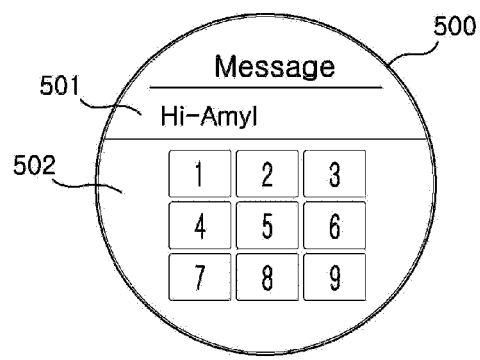
FIGS. 8A-8e illustrate an image displayed on a circle type display for a mobile terminal according to a fifth example of the present disclosure.

FIGS. 8A-8E illustrate an image displayed on a circle type display for a mobile terminal according to a fifth example of the present disclosure. FIG. 8A illustrates an example in which a message preparation screen or a message composer 500 may be displayed on the circle type display. The message preparation screen 500 may include a display window 501 (text display area) and an input window 502 (text input area). For example, a text message may be composed using the input window 502, and the corresponding text message may be displayed on the display window 501.

Figure 8B:
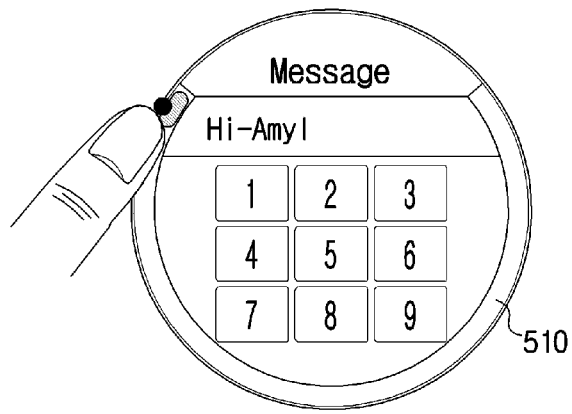

In this embodiment, if a blank or empty area of the display is touched for more than a predetermined period of time while the message preparation screen 500 is being displayed, a scroll bar 510 may be formed at an edge of the circle type display, as shown in FIG. 8B. Although the above example describes touching a blank portion of the display to display the scroll bar, this embodiment is not limited thereto, and the scroll bar may be generated by any predesignated input such as an input to a hotkey, touching a predetermined area on the display, or a predetermined input sequence (e.g., double tap on the display).

Figure 8C:
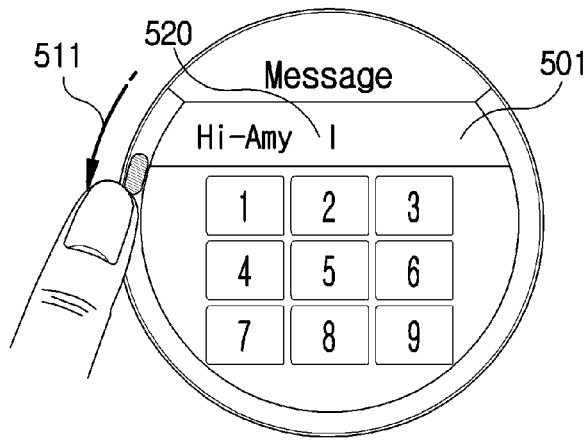
Figure 8D:
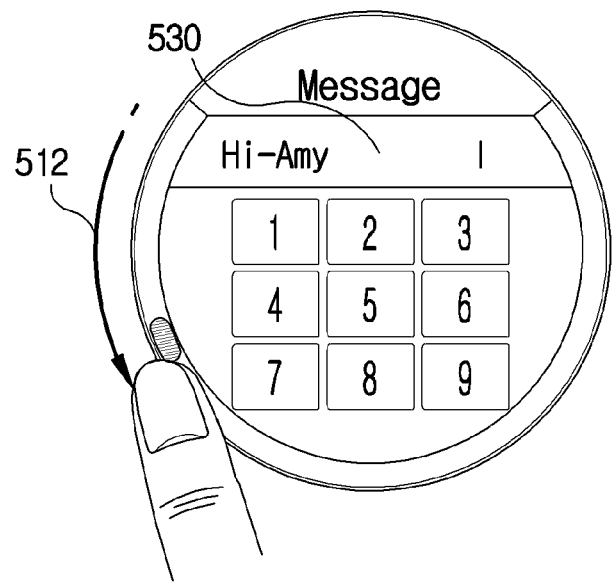

Referring to FIG. 8C, a touch-and-drag input on the scroll bar in a counterclockwise direction 511 may be configured to enter a space 520 in the display window 501. Additional spaces 530 may be added to the text display area 501 corresponding to the amount of the drag operation, as illustrated in FIG. 8D.

Figure 8E:
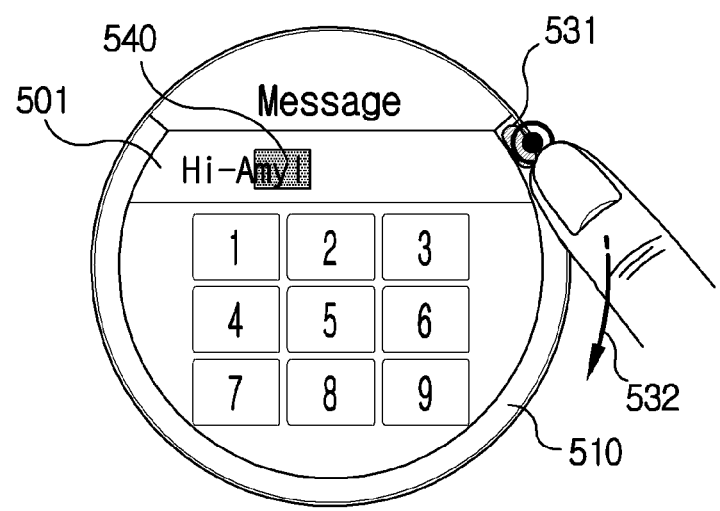

Moreover, referring to FIG. 8E, a touch-hold-and-drag input may initiate a text selection function. For example, if a point 531 on the scroll bar 510 is touched, held, and dragged in a clockwise direction 532, a cursor block 540 may be generated to select and highlight the text displayed in the display window 501. The cursor block 540 may be enlarged to select additional text corresponding to an amount which the point 531 is dragged.

Figure 9A:
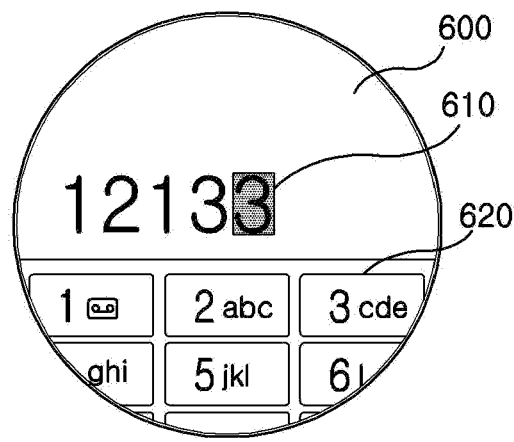
FIGS. 9A-9C illustrate an image displayed on a circle type display for a mobile terminal according to a sixth example of the present disclosure.
Figure 9B:
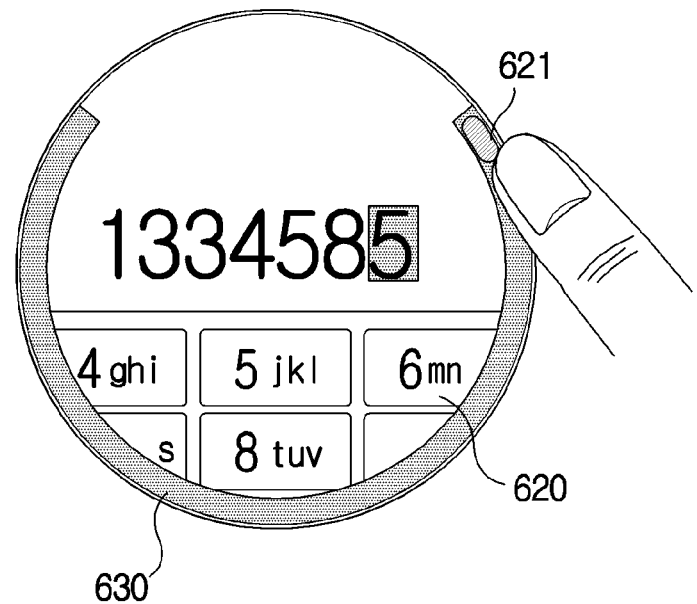
Figure 9C:
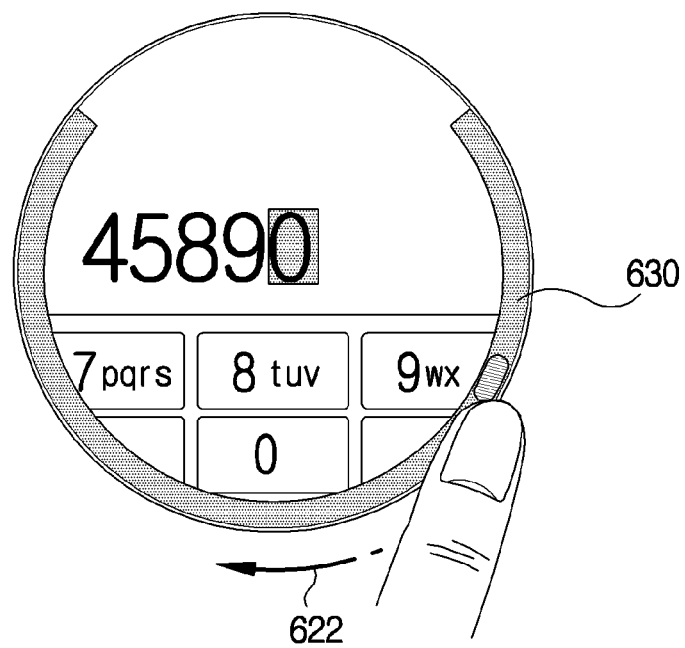

FIGS. 9A-9C illustrate an image displayed on a circle type display for a mobile terminal according to a sixth example of the present disclosure. FIG. 9A illustrates an example in which a telephone number input screen 600 is displayed on the display. The telephone number input screen 600 may include a telephone number display window 610 and a keypad 620. The keypad 620 may be partially displayed on the display to enlarge the displayed keys. For example, the display may be relatively small if the mobile terminal is a watch type and it may be desirable to enlarge the display of the keypad 620 accordingly.

In this embodiment, if a blank or empty area of the display is touched for more than a predetermined period of time while the telephone number input screen 600 is displayed, a scroll bar 630 may be generated at an edge of the circle type display, as shown in FIG. 9B. Although the above example describes touching a blank portion of the display to display the scroll bar, this embodiment is not limited thereto, and the scroll bar may be generated by any predesignated input such as an input to a hotkey, touching a predetermined area on the display, or a predetermined input sequence (e.g., double tap on the display).

A touch-and-drag input at a point 621 on the scroll bar 630 may be configured to change the displayed keypad 620, as illustrated in FIG. 9B. For example, the first row of the keypad 620 that includes the number keys 1, 2, and 3 may initially be displayed on the window 600, as shown in FIG. 9A. The touch-and-drag input may scroll the display of the keypad 620 to display the second row of the keypad 620 that includes the number keys 4, 5, and 6, as shown in FIG. 9B. If the drag operation is continued in a clockwise direction 622, the third row of the keypad 620 that includes the number keys 7, 8 and 9 may be displayed on the circle type display 151, as shown in FIG. 9C.

Figure 10A:
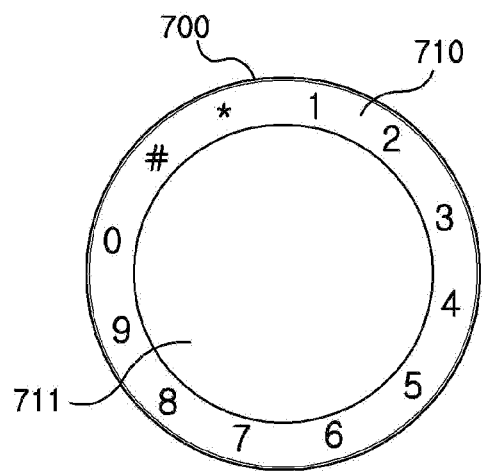
FIGS. 10A-10C illustrate an image displayed on a circle type display for a mobile terminal according to a seventh example of the present disclosure.
Figure 10B:
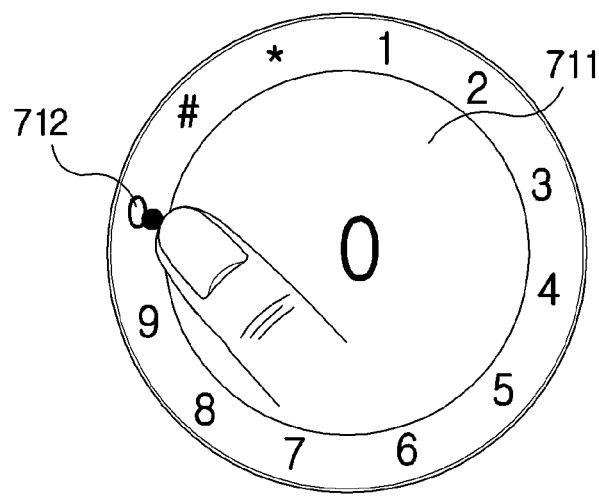
Figure 10C:
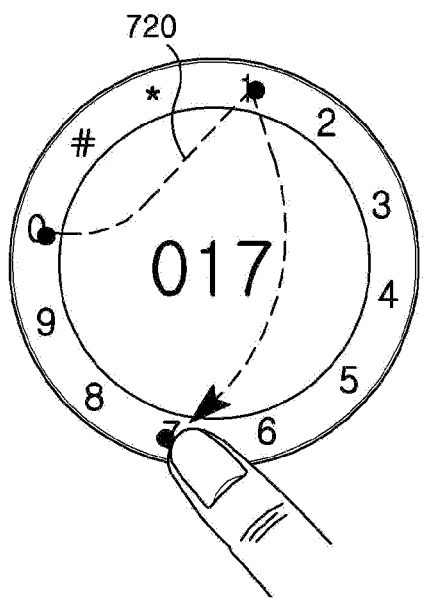

FIGS. 10A-10C illustrate an image displayed on a circle type display for a mobile terminal according to a seventh example of the present disclosure. FIG. 10A illustrates a screen 700 in which a number keypad is arranged at an edge 710 of the circle type display. The number key pad may be positioned around the outer circumference of the screen 700 at edge 710 and may display number keys and special character keys, for example, numbers 0 through 9, a "*" and/or "#" characters, or other appropriate characters. The display window 711 may be positioned at the center of the circle type display, inside the edge 710, as shown in FIG. 10A.

In this embodiment, if a number key 712 is selected, a number corresponding to the selected key 712 may be displayed on the display window 711, as shown in FIG. 10B. Moreover, consecutive characters or numbers may be selected for display, for example, if the user moves 720 from one character to another, and holds or selects each number key 712 for a predetermined amount of time, as shown in FIG. 10C. The movement 720 between characters may be a motion to drag a finger across the display or to select each key 712 separately. Moreover, the predetermined amount of time may be preset to prevent unwanted or accidental inputs, although this wait period may be unnecessary, for example, when it is desirable to increase response times of the display to the user inputs.

Figure 11A:
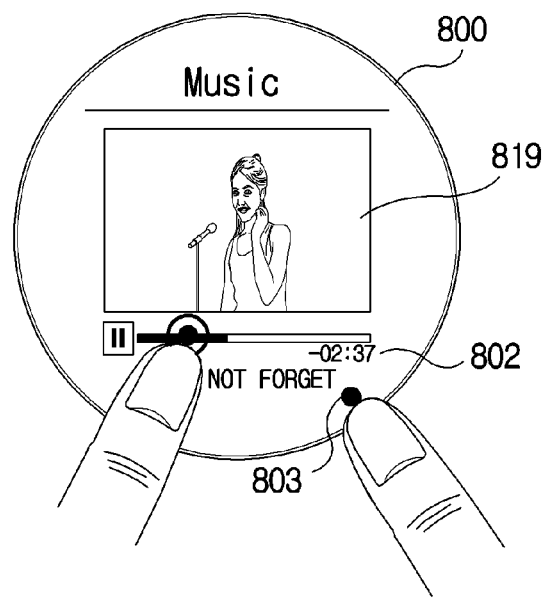
FIGS. 11A-11C illustrate an image displayed on a circle type display for a mobile terminal according to an eighth example of the present disclosure.
Figure 11B:
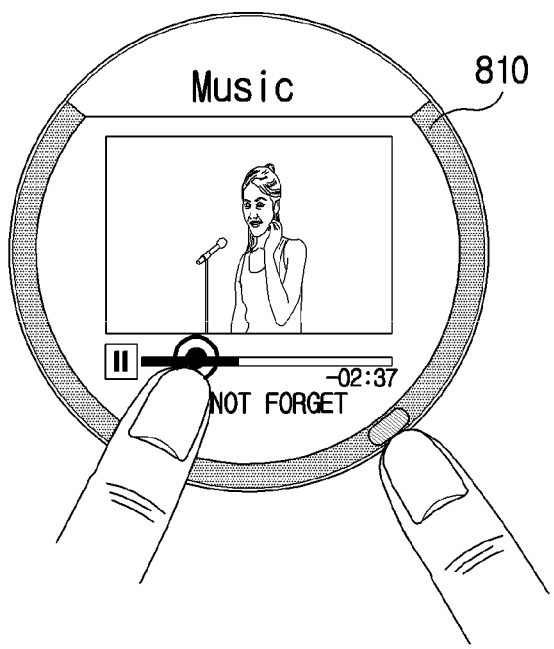
Figure 11C:
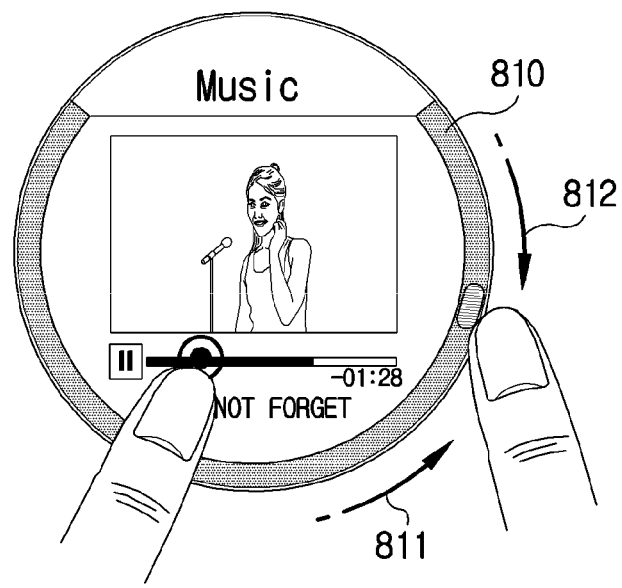

FIGS. 11A-11C illustrate an image displayed on a circle type display for a mobile terminal according to an eighth example of the present disclosure. FIG. 11A illustrates an example in which a moving picture image replay screen or a video playback screen 800 is illustrated on the circle type display. The video playback screen 800 may include a replay image 819 and a progress bar 802.

In this embodiment, the scroll bar 810 may be displayed in response to a simultaneous touch input on the progress bar 802 and an edge area 803, as shown in FIG. 11A. The scroll bar 810 may be used to navigate through the displayed video. For example, if a simultaneous touch input is applied at the progress bar 802 and the scroll bar 810, and the finger on the scroll bar 810 is dragged in a counterclockwise direction 811, a fast forward function may be initiated to navigate forward through the video, as displayed in FIG. 11C. At this time, the FF replay speed of the moving picture image may be varied based on the scroll speed. Likewise, if the touch-and-drag input is in the clockwise direction 812, a rewind operation may be initiated to navigate backwards through the video. At this time, the rewind replay speed of the moving picture image may correspond to the scroll speed.

Simply for ease of explanation, this embodiment has been described with reference to a video or a moving picture image, but it is not limited thereto. This embodiment may be applied to various types of media including, for example, audio files. Moreover, while this embodiment has been described using a simultaneous touch input to control navigation of the displayed image, other input functions may also be used, such an input to a hotkey, touching a predetermined area on the display, a predetermined input sequence (e.g., double tap on the display), or another appropriate input function.

For example, instead of a simultaneous input on the progress bar 802 and the scroll bar 810 to invoke the fast forward or rewind functions, the progress bar 802 may be selected for a predetermined period of time to invoke the navigation functions. Once invoked, the progress bar functions may be associated with the scroll bar functions such that the scroll bar 810 may control the progress bar 802. The progress bar 802 may then be highlighted to indicate that the navigation functions are active and assigned to the scroll bar 810. Then, the user may use, for example, a touch-and-drag input to navigate through the video in either direction by dragging a finger in either direction around the scroll bar 810. Moreover, a touch-and-drag input on the progress bar 802 may be used to control navigation of the video 819, although space constraints of the relatively small display on the mobile terminal may make controlling the video in this manner more difficult for the user.

Figure 12A:
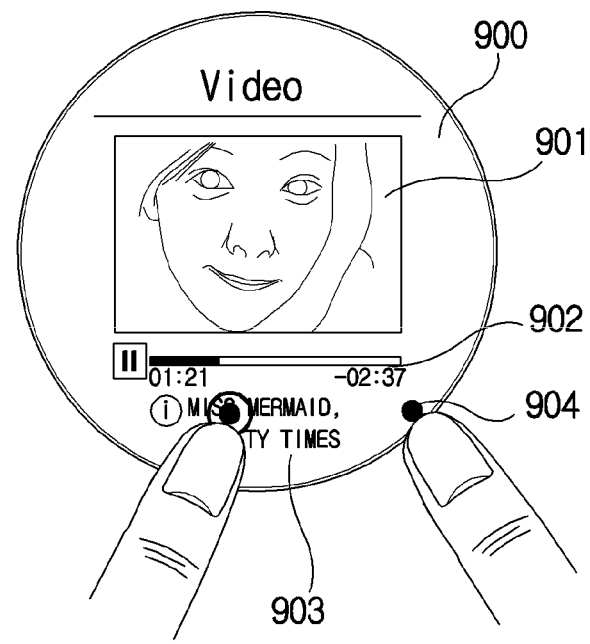
FIGS. 12A-12D illustrate an image displayed on a circle type display for a mobile terminal according to a ninth example of the present disclosure.

FIGS. 12A-12D illustrate an image displayed on a circle type display for a mobile terminal according to a ninth example of the present disclosure. FIG. 12A illustrates an example in which a moving picture image replay screen or a video playback screen 900 is illustrated on the circle type display. The video playback screen 900 may include a replay image 901, a progress bar 902, and a title or file information 903.

Figure 12B:
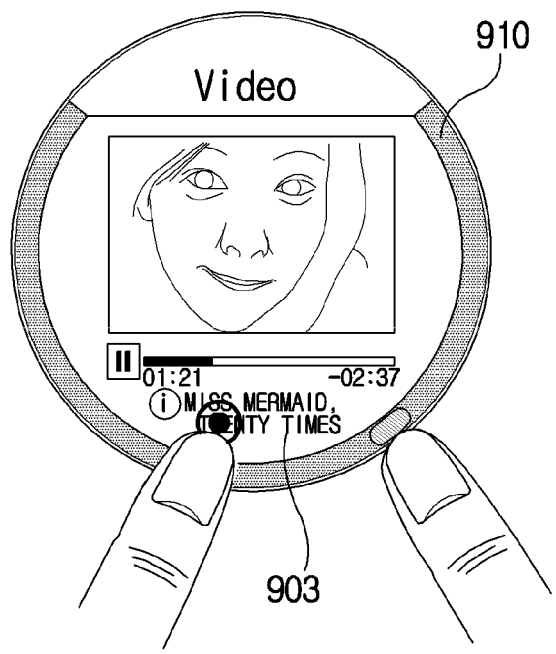
Figure 12C:
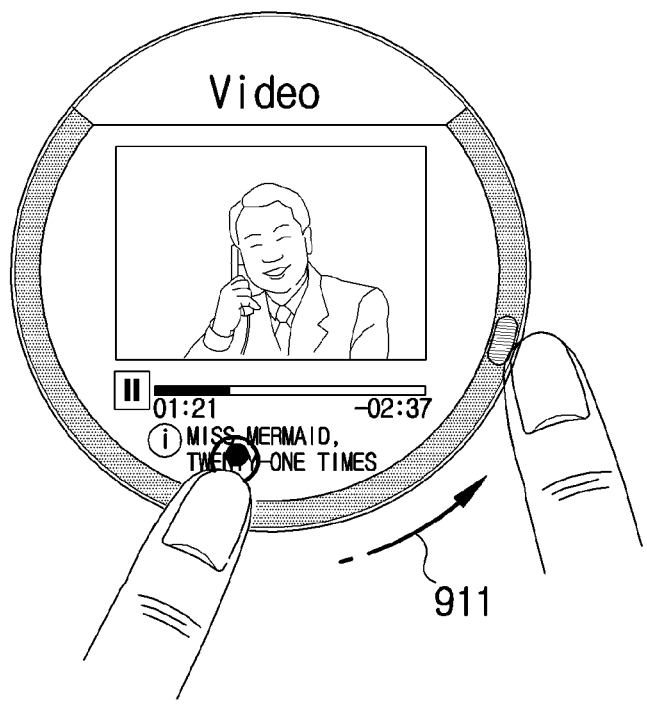

In this embodiment, the scroll bar 910 may be displayed in response to a simultaneous touch input on the progress bar 902 and an edge area 904, as shown in FIG. 12A. If the title 903 and an edge area 904 are simultaneously touched to generate the scroll bar 910, as shown in FIG. 12B, and the scroll bar 910 is scrolled in a counterclockwise direction 911, the next video in a video playlist may be displayed for playback, as shown in FIG. 12C. Alternatively, scrolling in the opposite direction may display a previous video on the video playlist for playback.

Figure 12D:
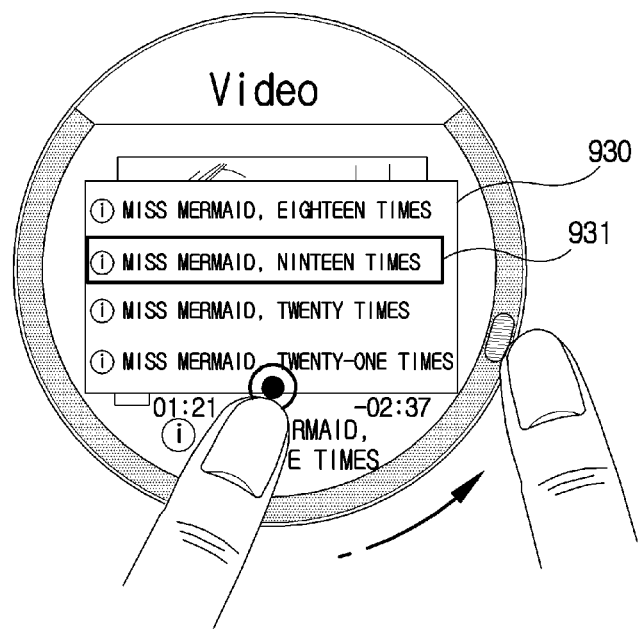

Moreover, an input on the scroll bar 910 may generate a video playlist or a moving picture image file list 930 for display, as shown in FIG. 12D. Thereafter, a cursor 931 on the playlist may be moved in response to a simultaneous touch-and-drag input on the scroll bar 910 and the video playlist 930. Alternatively, the scroll bar 910 may be assigned to the video playlist 930 once the playlist 930 is displayed. In this case, a simultaneous input may not be necessary, and a touch-and-drag input on the scroll bar may control navigation through the playlist.

Simply for ease of explanation, this embodiment has been described with reference to a video or a moving picture image, but it is not limited thereto. This embodiment may be applied to various types of media including, for example, audio files. Moreover, while this embodiment has been described using a simultaneous touch input to control navigation of the displayed image, other input functions may also be used such as an input to a hotkey, touching a predetermined area on the display, a predetermined input sequence (e.g., double tap on the display), or another appropriate input function.

For example, instead of a simultaneous input on the title 903 and the scroll bar 910 to enable browsing between video files on a playlist, the title 903 may be selected for a predetermined period of time to invoke the browsing function. Once invoked, the browsing function may be controlled by the scroll bar 910 such that the title 903 does not have to be selected again using the simultaneous input. The title 903 may be highlighted to indicate that the browsing function is active and assigned to the scroll bar 910. Then, the user may use, for example, a touch-and-drag input to navigate through the video files in the playlist by dragging a finger in either direction around the scroll bar 910.

In another embodiment, the displayed video 901 may be replaced with another video on a playlist by a touch-and-drag input on the displayed video 901. For example, the displayed video 901 may be toggled to another video by selecting the displayed video and dragging the video 901 towards either to the right or the left of the screen 900. In this way, the user may browse to a previous or subsequent video file on the video playlist 930.

Figure 13A:
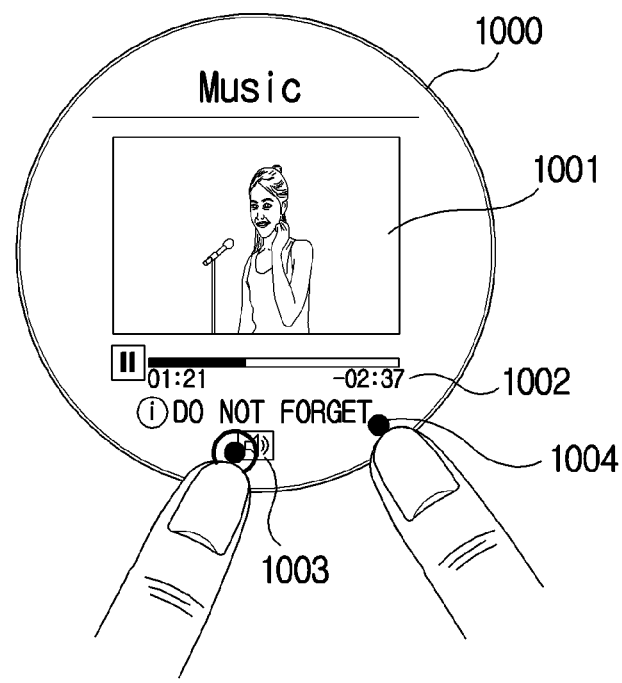
FIGS. 13A-13C illustrate an image displayed on a circle type display for a mobile terminal according to a tenth example of the present disclosure.
Figure 13B:
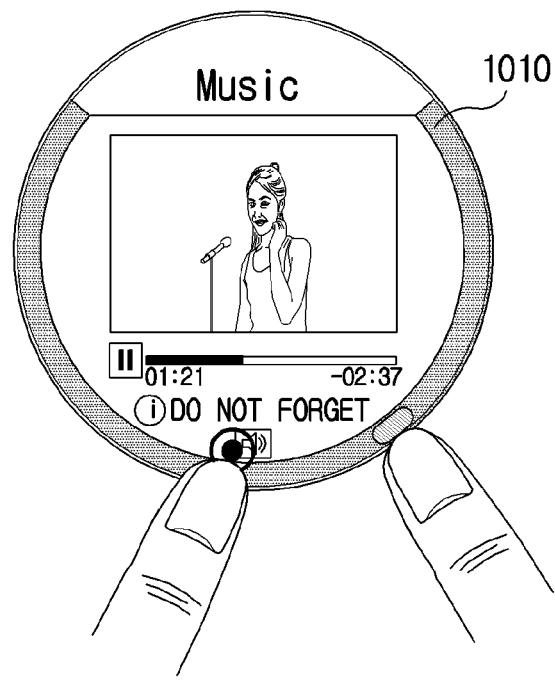
Figure 13C:
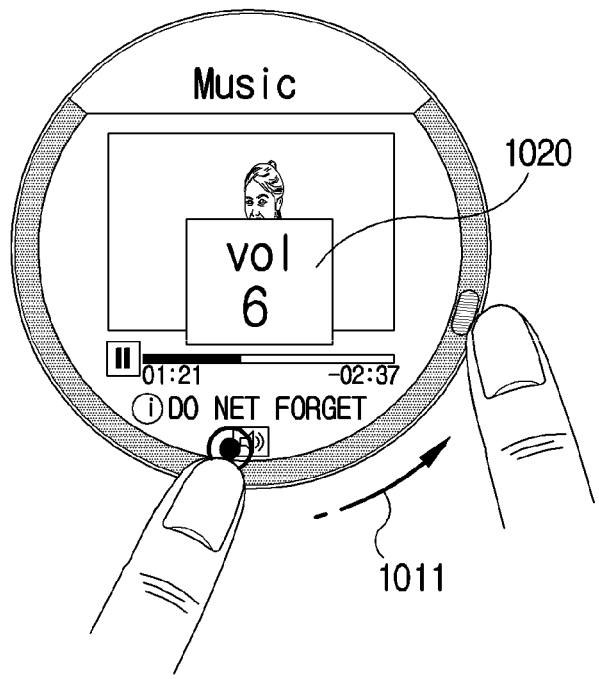

FIGS. 13A-13C illustrate an image displayed on a circle type display for a mobile terminal according to a tenth example of the present disclosure. FIG. 13A illustrates an example in which a moving picture image replay screen or a video playback screen 1000 is displayed on the circle type display. The moving picture image replay screen 1000 may include a replay image 1001, a progress bar 1002, and a volume icon 1003.

If the volume icon 1003 and an edge area 1004 are simultaneously touched to generate a scroll bar 1010, as shown in FIG. 13A, the scroll bar 1010 may be displayed at the edge area on the playback screen 1000 and the scroll bar 1010 may be used to adjust the volume of the replay image 1001. For example, if the scroll bar 1010 is scrolled in one direction 1011 (e.g., a counterclockwise direction), the volume may be increased. Scrolling in the opposite direction may decrease the volume. At this time, a volume display window 1020 may be displayed on the circle type display to indicate the volume level, as shown in FIG. 13C.

Simply for ease of explanation, this embodiment has been described with reference to a video or a moving picture image, but it is not limited thereto. This embodiment may be applied to various types of media including, for example, audio files. Moreover, while this embodiment has been described using a simultaneous touch input to adjust the volume level, other input functions may also be used such as an input to a hotkey, touching a predetermined area on the display, a predetermined input sequence (e.g., double tap on the display), or another appropriate input function.

For example, instead of a simultaneous input on the volume icon 1003 and the scroll bar 1010 to enable volume control, the icon 1003 may be selected for a predetermined period of time to invoke the volume control function. Once invoked, the volume may be controlled by the scroll bar 1010 such that the icon 1003 does not have to be selected again using the simultaneous input. The icon 1003 may be highlighted to indicate that the volume control function is active and assigned to the scroll bar 910. Then, the user may use, for example, a touch-and-drag input to adjust the volume levels by dragging a finger in either direction around the scroll bar 1010. Alternatively, a selection of the icon 1003 may display a popup window on the display 1000 to provide the user with volume controls, although size constraints of the mobile terminal may make controlling the volume on the screen without the aid of the scroll bars more difficult.

Figure 14A:
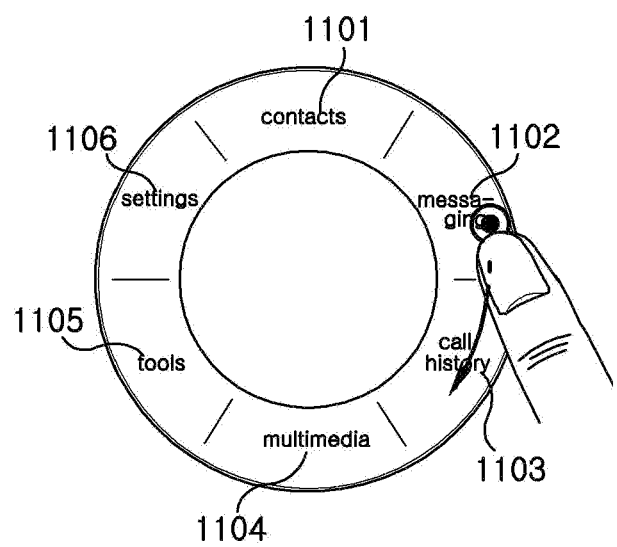
FIGS. 14A-14D illustrate an image displayed on a circle type display for a mobile terminal according to an eleventh example of the present disclosure.
Figure 14B:
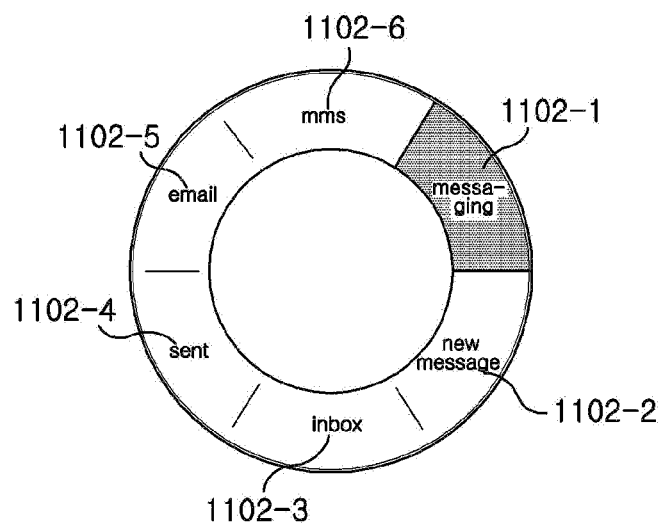
Figure 14C:
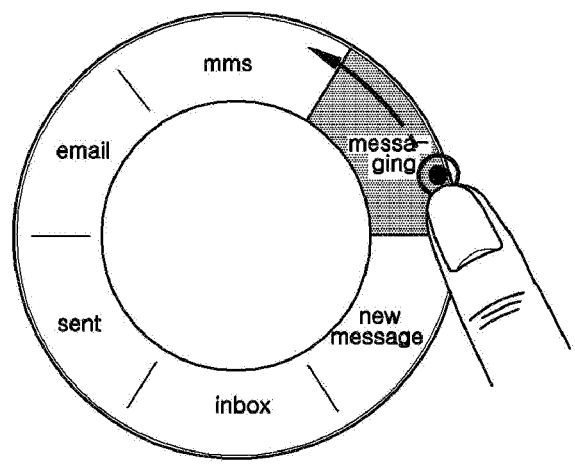
Figure 14D:
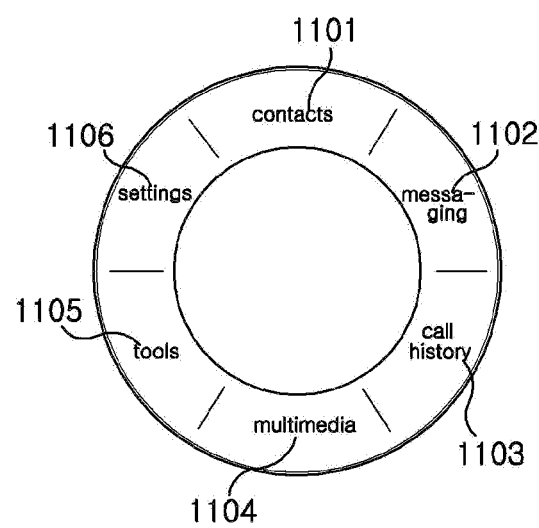

FIGS. 14A-14D illustrate an image displayed on a circle type display for a mobile terminal according to an eleventh example of the present disclosure. FIG. 14A illustrates an example in which a plurality of menu items may be arranged on an edge of the circle type display. For example, a plurality of main menu items 1101-1106 may be provided around the interior circumference of the circle type display. A touch-and-drag input in one direction (e.g., a clockwise direction) on one of the plurality of main menu items 1102 may replace the other menu items 1101, 1103, 1104, 1105, 1106 with sub menu items 1102-1-1102-6 which are associated with the selected main menu item 1102, as shown in FIG. 14B. A touch-and-drag input in another direction (e.g., a counterclockwise direction) on one of the sub menu items 1102-1-1102-6 may revert the display to display the main menu items 1101-1106, as shown in FIGS. 14C and 14D.

Simply for ease of discussion, a scroll bar is disclosed herein to control the various displays of the mobile terminal. However, the embodiments as disclosed are not limited thereto and it should be appreciated that other methods of controlling the displayed images may be provided in conjunction with the scroll bar as described herein. For example, referring again to FIG. 4A-4F, the menu list 201 may be scrolled or changed using the scroll bar 215 as described. However, other inputs to the touch screen in addition to the scroll bar 215 may be provided to control the displayed images. For example, a touch-and-drag input on the menu list 201 in a downward direction may also scroll down the menu list 201. Due to the limited size of the display in the mobile terminal, it may be desirable to provide multiple methods of controlling the display. With the scroll bar 215, for example, when there are a large amount of items in the list 201, it may be possible for the user to scroll the entire list faster with one input. Additionally, the scroll bar as disclosed may provide improved access and control in inputting commands on the mobile terminal, for example, when the items to be selected on the display are small in size.

A method for displaying data in a user device to be wearable on wrist of a user having a circle type display is broadly described and embodied herein, wherein the method may include detecting a user input; generating a scroll bar at an edge of the circle type display in response to the detected user input; detecting a first touch input on the scroll bar, wherein the first touch input is a touch-and-drag input on the scroll bar; and performing a first change to a data displayed on the circle type display in response to the detected first touch input.

The method may also include detecting a second touch input on the scroll bar, wherein the second touch input is a touch-and-drag input on the scroll bar, and performing a second change to the data displayed on the circle type display in response to the detected second touch input, changing a color of the scroll bar in response to the second touch input, wherein the performing the first change includes scrolling the data displayed on the circle type display, and the performing the second change includes a zoom-in or zoom-out of the data displayed on the circle type display. The method may further include detecting a third touch input on the scroll bar, wherein the third touch input comprises a simultaneous touch input at two separate locations on the scroll bar, and performing a third change to the data displayed on the circle type display unit in response to the third touch input. In this method, the performing the first change may include scrolling the data displayed on the circle type display, and the performing the second change may include a zoom-in or zoom-out of the data displayed on the circle type display, and the performing the third change may include moving the data displayed on the circle type display.

Moreover, the method may include displaying a menu list on the circle type display unit, wherein the scroll bar comprises a title scroll bar and a menu scroll bar; displaying a menu list on the circle type display unit, and displaying an index of the menu list on the scroll bar. The method may include displaying a plurality of menu items on the scroll bar, detecting a touch-and-drag input on at least one of the plurality of menu items, and replacing each of the plurality of menu items except the touched menu item with a sub-menu item associated with the touched menu item. The method may also include displaying a control menu on the circle type display; and detecting a third touch input on the scroll bar, wherein the third touch input comprises a simultaneous touch input at the control menu and the scroll bar, and performing a third change to the data displayed on the circle type display unit in response to the third touch input.

A display device for a wrist watch is broadly described and embodied herein, including a circle type display configured to display data; and a controller configured to display a scroll bar at an edge of the circle type display in response to a user input and to change the displayed data on the circle type display in response to a first touch input on the scroll bar, wherein the first touch input is a touch-and-drag input on the scroll bar.

In the display device, the controller may control the circle type display to change the data displayed on the circle type display in response to a second touch input, wherein the second touch input may be a touch hold-and-drag on the scroll bar, and wherein the controller controls the circle display unit such that a color of the scroll bar is changed in response to the second touch input. In the display device the change in response to a first touch input scrolls the data displayed on the circle type display, and the change in response to the second touch input includes a zoom-in or zoom-out of the data displayed on the circle type display, wherein the controller controls the circle type display to change the data displayed on the circle type display in response to a third touch input. Moreover, the third touch input may be a simultaneous touch input at two separate locations on the scroll bar, wherein the change in response to the first touch input scrolls the data displayed on the circle type display, the change in response to the second touch input includes a zoom-in and zoom-out of the data displayed on the circle type display, and the change in response to the third touch input moves the data displayed on the circle type display.

In the display device, the data may be a menu list, and the scroll bar may include a title scroll bar and a menu scroll bar. Moreover, the data may be a menu list and the controller may control the circle type display unit to display the scroll bar with an index of the menu list, wherein a plurality of menu items are displayed on the scroll bar, and wherein in response to a touch-and-drag input on at least one of the plurality of menu items. The controller may be configured to replace each of the plurality of menu items except the touched menu item with a sub-menu item associated with the touched menu item. Moreover, the circle type display may be configured to display a control menu associated with the data, and wherein the controller is configured to change the data displayed in response to a third touch input on the scroll bar, wherein the third touch input comprises a simultaneous touch input at the control menu and the scroll bar.

In an embodiment of the present disclosure, a method for controlling data in a mobile terminal having a circle type display unit may include generating a scroll bar at an edge of the circle type display unit responsive to a user selection signal; and performing a first change to displayed data displayed on the circle type display unit responsive to a first touch signal generated by touch-and-drag of the scroll bar.

The method may further include performing a second change to the displayed data displayed on the circle type display unit responsive to a second touch signal generated by touch hold-and-drag of the scroll bar; changing a color of the scroll bar responsive to a generation of the second touch signal. The first change may be a scroll change, and the second change may be zoom-in and zoom-out change.

The method may further include performing a third change to the data displayed on the circle type display unit responsive to a third touch signal generated by a simultaneous touch input to the scroll bar, wherein the first change may be a scroll change, the second change may be zoom-in and zoom-out change, and the third change may be a movement change. The method may further include displaying a menu list on the circle type display unit, wherein the scroll bar may include a title scroll bar and a menu scroll bar; displaying a menu list on the circle type display unit; and displaying an index of the menu list on the scroll bar; displaying a plurality of menu items on the scroll bar; and displaying a sub item of a touched main item on a scroll bar area except for an area where the touched menu item is displayed, if a touch and drag is performed on at least one of the plurality of menu items. The method may also include displaying a control menu on the circle type display unit; and generating a third touch signal responsive to a simultaneous touch input to the control menu and the scroll bar.

In another embodiment of the present disclosure, a mobile terminal may include: a circle type display unit configured to display data; a controller configured to form a scroll bar at an edge of the circle type display unit responsive to a user selection signal and to control the circle type display unit such that a first change can be implemented to a displayed data responsive to a first touch signal generated by a touch and drag operation to the scroll bar.

The controller may control the circle type display unit such that a second change to displayed data displayed on the circle type display unit can be implemented responsive to a second touch signal generated by touch hold-and-drag of the scroll bar. The controller may control the circle display unit such that color of the scroll bar can be changed responsive to the second touch signal, wherein the first change may be a scroll change, and the second change may be zoom-in and zoom-out change.

Moreover, the controller may control the circle type display unit such that a third change can be implemented to the data displayed on the circle type display unit responsive to a third touch signal generated by a simultaneous touch input to the scroll bar, wherein the first change may be a scroll change, the second change may be zoom-in and zoom-out change, and the third change may be a movement change, and wherein the data may be a menu list, and the scroll bar may include a title scroll bar and a menu scroll bar. The data may also be a menu list and the controller may control the circle type display unit such that the scroll bar is displayed with an index of the menu list.

The circle type display unit may be further configured to display a control menu relative to the data, and the controller may control the circle type display unit responsive to a third touch signal by generating the third touch signal responsive to a simultaneous touch input to the control menu and the scroll bar. The scroll bar may be displayed with a plurality of menu items and the controller may display a sub item of a touched main item on a scroll bar area except for an area where the touched menu item is displayed, if a touch and drag is performed on at least one of the plurality of menu items.

The embodiments as broadly described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors and other appropriate electrical components for performing the disclosed functions. In some cases, the embodiments may be implemented by the controller 180.

The embodiments may also be implemented as separate software modules, for example, as separate procedures and functions, each of which may perform one or more of the functions and operations described herein. Software codes may be implemented with a software application written in any suitable programming language and may be stored in memory such as the memory 160, and may be executed by a controller 180 or a processor.

The above-described methods may be implemented in a program recorded medium such as computer-readable codes or computer-readable media. The computer-readable media may include all kinds of recording devices in which data readable by a computer system may be stored. The computer-readable media may include, for example, ROM, RAM, CD-ROM, magnetic tapes, floppy discs, optical data storage devices, and the like, and also may include carrier-wave type implementations (e.g., transmission via Internet).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for displaying data in a device having a circle type display, the method comprising:
   displaying a first menu and data related to the first menu on the circle type display;
   receiving a first touch input having a prescribed duration on an area of the circle type display where the first menu and the data are not displayed;
   displaying a scroll bar along a portion of a circumference of the circle type display in response to the first touch input;
   receiving a first drag input on the scroll bar, the first drag input being in one of a clockwise or a counter-clockwise directions; and
   scrolling the data related to the first menu in a first direction in response to the first drag input,
   wherein the scroll bar is displayed on an area where the data related to the first menu is displayed.

2. The method of claim 1, wherein the scroll bar is displayed while the first touch input is maintained.

3. The method of claim 1, wherein a direction of the scrolling the data corresponds to the direction of the first drag input.

4. The method of claim 1, further comprising:
   receiving a second drag input on the scroll bar, wherein the second drag input is in one of the clockwise or the counter-clockwise directions opposite the first drag input.

5. The method of claim 4, further comprising:
   scrolling the data in a second direction in response to the second drag input.

6. The method of claim 5, wherein the second direction is opposite to the first direction.

7. The method of claim 1, wherein the scroll bar is displayed on an area where the first touch input is received.

8. The method of claim 1, further comprising:
   receiving a second touch input on a prescribed area of the circle type display; and
   changing the first menu to the second menu in response to the second touch input.

9. A mobile terminal comprising:
   a display having a round shape and configured to display a first menu and data related to the first menu and to receive touch inputs; and
   a controller configured to
   receive a first touch input having a prescribed duration on an area of the display where the first menu and the data are not displayed,
   control the display to display a scroll bar along a portion of a circumference of the display in response to the first touch input,
   receive a first drag input on the scroll bar, the first drag input being in one of a clockwise or a counter-clockwise directions, and scroll the data related to the first menu in a first direction in response to the first drag input, wherein the scroll bar is displayed on an area where the data related to the first menu is displayed.

10. The mobile terminal of claim 9, wherein the scroll bar is displayed while the first touch input is maintained.

11. The mobile terminal of claim 9, wherein a direction of the scrolling the data corresponds to the direction of the first drag input.

12. The mobile terminal of claim 9, wherein the controller is configured to receive a second drag input on the scroll bar, wherein the second drag input is in one of the clockwise or the counter-clockwise directions opposite the first drag input.

13. The mobile terminal of claim 12, wherein the controller is configured to scroll the data in a second direction in response to the second drag input.

14. The mobile terminal of claim 13, wherein the second direction is opposite to the first direction.

15. The mobile terminal of claim 9, wherein the scroll bar is displayed on an area where the first touch input is received.

16. A method for displaying data in a device having a circle type display, the method comprising:

displaying data on the circle type display;

receiving a touch input having a prescribed duration on an area of the circle type display where the data is not displayed;

displaying a scroll bar along a portion of a circumference of the circle type display in response to the touch input, the scroll bar including at least one index corresponding to the data;

receiving a drag input on the scroll bar, the drag input being positioned to select at least one of the indexes; and displaying a portion of the data corresponding to the selected indexes.

17. The method of claim 16, wherein the drag input is in one of a clockwise or a counter-clockwise directions.

18. The method of claim 16, wherein the index includes an initial index.

19. A mobile terminal comprising:

a display having a round shape and configured to display data and to receive touch inputs;

a controller configured to:

receive a touch input having a prescribed duration on an area of the circle type display where the data is not displayed, control the display to display a scroll bar along a portion of a circumference of the circle type display in response to the touch input, the scroll bar including at least one index corresponding to the data, receive a drag input on the scroll bar, the drag input being positioned to select at least one of the indexes, and control the display to display a portion of the data corresponding to the selected indexes.

20. The mobile terminal of claim 18, wherein the drag input is in one of a clockwise or a counter-clockwise directions.

21. The mobile terminal of claim 18, wherein the index includes an initial index.

* * * * *